US007665305B2

(12) United States Patent
Cornwell et al.

(10) Patent No.: US 7,665,305 B2
(45) Date of Patent: Feb. 23, 2010

(54) VALVE ASSEMBLY FOR MODULATING FUEL FLOW TO A GAS TURBINE ENGINE

(75) Inventors: Michael D. Cornwell, Bloomington, MN (US); Randy C. Baxter, Taylors, SC (US); Michael Forst, Taylors, SC (US); Jerry L. Goeke, West Des Moines, IA (US)

(73) Assignee: Delavan Inc, West Des Moines, IA (US)

( * ) Notice: Subject to any disclaimer, the term of this patent is extended or adjusted under 35 U.S.C. 154(b) by 519 days.

(21) Appl. No.: 11/321,203

(22) Filed: Dec. 29, 2005

(65) Prior Publication Data

US 2007/0151252 A1   Jul. 5, 2007

(51) Int. Cl.
*F02C 1/00* (2006.01)
(52) U.S. Cl. .................................. 60/740; 137/599.07
(58) Field of Classification Search .............. 60/740, 60/741, 734, 39.81; 137/599.06, 599.07; 137/601.14; 123/445
See application file for complete search history.

(56) References Cited

U.S. PATENT DOCUMENTS

| 2,468,584 | A | * | 4/1949 | Wotring .................. 134/57 DL |
| 2,975,785 | A | | 3/1961 | Sheldon |
| 3,352,155 | A | * | 11/1967 | Penet ........................... 73/198 |
| 3,532,121 | A | | 10/1970 | Sturman et al. |
| 3,689,773 | A | | 9/1972 | Wheeler |
| 3,762,442 | A | | 10/1973 | Paul |
| 3,772,540 | A | * | 11/1973 | Benson ........................ 310/14 |
| 4,521,088 | A | | 6/1985 | Masom |
| 4,709,155 | A | | 11/1987 | Yamaguchi et al. |
| 4,976,227 | A | * | 12/1990 | Draper ..................... 123/80 R |
| 5,051,631 | A | | 9/1991 | Anderson |
| 5,071,105 | A | | 12/1991 | Donze et al. |
| 5,257,496 | A | | 11/1993 | Brown et al. |
| 5,303,684 | A | | 4/1994 | Brown et al. |
| 5,404,709 | A | | 4/1995 | Mac Lean et al. |
| 5,474,234 | A | * | 12/1995 | Maley ......................... 239/88 |

(Continued)

FOREIGN PATENT DOCUMENTS

EP       0 638 770 A1   2/1995

(Continued)

OTHER PUBLICATIONS

U.S. Appl. No. 12/116,928, Goeke et al.

(Continued)

*Primary Examiner*—Michael Cuff
*Assistant Examiner*—Phutthiwat Wongwian
(74) *Attorney, Agent, or Firm*—Scott D. Wofsy; Edwards Angell Palmer & Dodge LLP

(57) ABSTRACT

A valve assembly is disclosed for modulating the flow of fuel to a fuel nozzle at a high frequency or in a stepped manner to actively control combustion in a gas turbine engine which includes a valve housing defining an inlet portion for receiving fuel from a fuel source at an initial flow rate and an outlet portion for delivering fuel to a fuel nozzle at the initial flow rate or a modulated flow rate depending upon a detected combustion condition, and a mechanism disposed within the valve housing for modulating the flow rate of fuel to the outlet portion in response to a detected combustion condition.

31 Claims, 19 Drawing Sheets

U.S. PATENT DOCUMENTS

| | | | |
|---|---|---|---|
| 5,488,340 A * | 1/1996 | Maley et al. | 335/253 |
| 5,608,515 A | 3/1997 | Shu et al. | |
| 5,784,300 A | 7/1998 | Neumeier et al. | |
| 5,791,889 A | 8/1998 | Gemmen et al. | |
| 5,797,266 A | 8/1998 | Brocard et al. | |
| 5,809,769 A | 9/1998 | Richards et al. | |
| 5,828,797 A | 10/1998 | Minott et al. | |
| 5,857,320 A | 1/1999 | Amos et al. | |
| 5,961,314 A | 10/1999 | Myhre et al. | |
| 6,058,709 A | 5/2000 | Richards et al. | |
| 6,059,560 A | 5/2000 | Richards et al. | |
| 6,142,665 A | 11/2000 | Haffner et al. | |
| 6,205,764 B1 | 3/2001 | Hermann et al. | |
| 6,205,765 B1 | 3/2001 | Iasillo et al. | |
| 6,244,291 B1 * | 6/2001 | Hughes | 137/312 |
| 6,454,548 B2 | 9/2002 | Falk et al. | |
| 6,517,045 B1 * | 2/2003 | Northedge | 251/65 |
| 6,566,158 B2 | 5/2003 | Eriksen et al. | |
| 6,598,621 B1 | 7/2003 | Wygnanski | |
| 6,640,548 B2 | 11/2003 | Brushwood et al. | |
| 6,672,071 B2 | 1/2004 | Woltmann | |
| 6,688,534 B2 | 2/2004 | Bretz | |
| 6,773,951 B2 | 8/2004 | Eriksen et al. | |
| 6,848,667 B1 | 2/2005 | Wygnanski | |
| 6,918,569 B2 | 7/2005 | Jansen | |
| 6,928,878 B1 | 8/2005 | Eriksen et al. | |
| 7,004,449 B2 | 2/2006 | Jansen | |
| 7,007,661 B2 | 3/2006 | Warlick | |
| 2002/0125336 A1 | 9/2002 | Bretz | |
| 2002/0134138 A1 | 9/2002 | Philipp et al. | |
| 2003/0056490 A1 * | 3/2003 | Anderson et al. | 60/39.281 |
| 2003/0056517 A1 | 3/2003 | Brushwood et al. | |
| 2003/0155031 A1 | 8/2003 | Barton et al. | |
| 2004/0154300 A1 | 8/2004 | Woltmann | |
| 2005/0107942 A1 | 5/2005 | Nomura et al. | |
| 2005/0180699 A1 | 8/2005 | Shu et al. | |
| 2005/0189021 A1 * | 9/2005 | Wygnanski | 137/625.44 |
| 2005/0247066 A1 * | 11/2005 | Myhre | 60/803 |
| 2006/0000219 A1 | 1/2006 | Myhre | |
| 2006/0213200 A1 | 9/2006 | Critchley et al. | |
| 2006/0219968 A1 | 10/2006 | Jansen | |
| 2007/0119147 A1 | 5/2007 | Cornwell et al. | |
| 2008/0000214 A1 | 1/2008 | Kothnur et al. | |
| 2009/0013693 A1 | 1/2009 | Ols et al. | |
| 2009/0026398 A1 | 1/2009 | Overman et al. | |
| 2009/0049927 A1 | 2/2009 | Spivak et al. | |
| 2009/0077945 A1 | 3/2009 | Cornwell et al. | |

FOREIGN PATENT DOCUMENTS

| | | |
|---|---|---|
| EP | 0 816 760 A1 | 1/1998 |
| EP | 0 926 325 A2 | 6/1999 |
| EP | 1 559 887 A2 | 8/2005 |
| GB | 2 342 504 | 4/2000 |
| GB | 2 342 782 | 4/2000 |
| GB | 2 377 555 | 1/2003 |
| GB | 2 380 064 A | 3/2003 |
| GB | 2 380 065 A | 3/2003 |
| JP | 08-68573 | 3/1996 |
| WO | WO 99/30006 | 6/1999 |
| WO | WO 00/20786 | 4/2000 |
| WO | WO 02/086364 A1 | 10/2002 |
| WO | WO 03/102454 A | 12/2003 |
| WO | WO 2005/047670 A2 | 5/2005 |
| WO | WO 2005/047670 A3 | 5/2005 |

OTHER PUBLICATIONS

U.S. Appl. No. 12/046,977, Williams et al.

Hermann et al.; "Active Instability Control (AIC) of Spray Combustors by Modulation of the Liquid Fuel Flow Rate"; Combust. Sci. and Tech., 1996, vol. 118, pp. 1-25.

Paschereit et al.; "Acoustic Control of Combustion Instabilities and Emissions in a Gas-Turbine Combustor"; Proceedings of the 1998 IEEE.

Haile et al.; "Characterization of a Liquid Fuel Injector under Continuous and Modulated Flow Conditions"; Part. Part. Syst. Charact. 15 (1998) 136-144.

Cohen et al.; "Active Control of Combustion Instability in a Liquid-Fueled Low-N0x Combustor"; Journal of Engineering for Gas Turbines and Power, Apr. 1999, vol. 121/281.

Heising et al.; "Periodic Liquid Fuel Sprays Combustion Processes and Their Damping of Combustion Instabilities"; American Institute of Aeronautics and Astronautics, 1999.

Johnson et al.; "Effects of Time Delay and System Noise Upon Active Control of Unstable Combustors"; American Institute of Aeronautics and Astronautics, 2001-0778.

Murugappan et al.; "Application of Extremum Seeking Controller for Suppression of Combustion Instabilities in Spray Combustion"; American Institute of Aeronautics and Astronautics, 2000-1025.

Magill et al.; "Combustion Dynamics and Control in Liquid-Fueled Direct Injection Systems"; American Institute of Aeronautics and Astronautics, 2000-1022.

U.S. Appl. No. 11/652,718, Myhre.

U.S. Appl. No. 12/368,472, Goeke et al.

Darling et al.; "Demonstration of Active Control of Combustion Instabilities on a Fuel-Scale Gas Trubine Combustor"; ASME Turbo Expo 2001, Jun. 4-7, 2001.

Wu et al.; "High Response Valve for Active Combustion Control"; Proceedings of ASME Turbo Expo 2001, Jun. 4-7, 2001.

Johnson et al.; "Demonstration of Active Control of Combustion Instabilities on a Full-Scale Gas Turbine Combustor"; American Society of Mechanical Engineers, Apr. 11, 2002.

Hoff, et al., Closed-Loop Combustion Control using OH Radical Emissions, Proceedings of ASME Turboexpo 2000, May 8-11, 2000, Munich Germany.

Natural Gas Fuel for General Electric Aircraft Derivative Gas Turbines in Industrial Applications, General Electric Company Marine & Industrial Engine Projects Department, Cincinnati, Ohio 45215, MID-TD-0001-1, Aug. 1985.

J.E. May; "Active Pattern Factor Control for Gas Turbine Engines", Published 1998 NASA. Available from http://www.grc.nasa.gov/WWW/RT/RT1997/5000/5540may.htm, Apr. 15, 1998 [cited based on URL content as of Jul. 9, 2009].

* cited by examiner

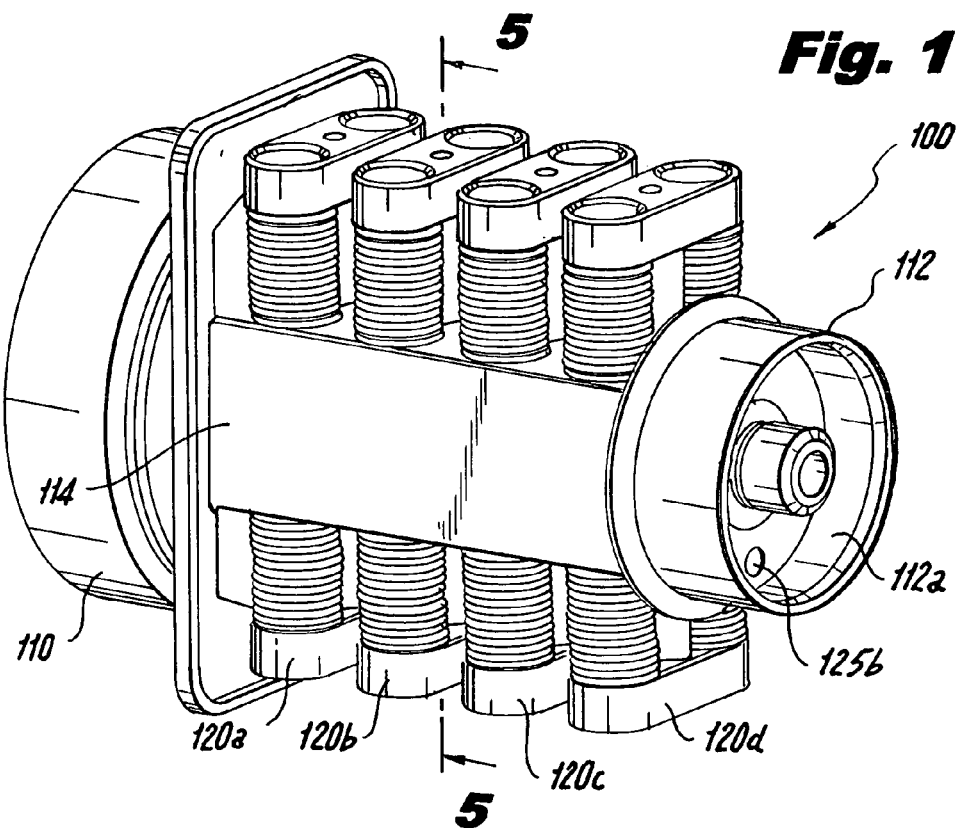
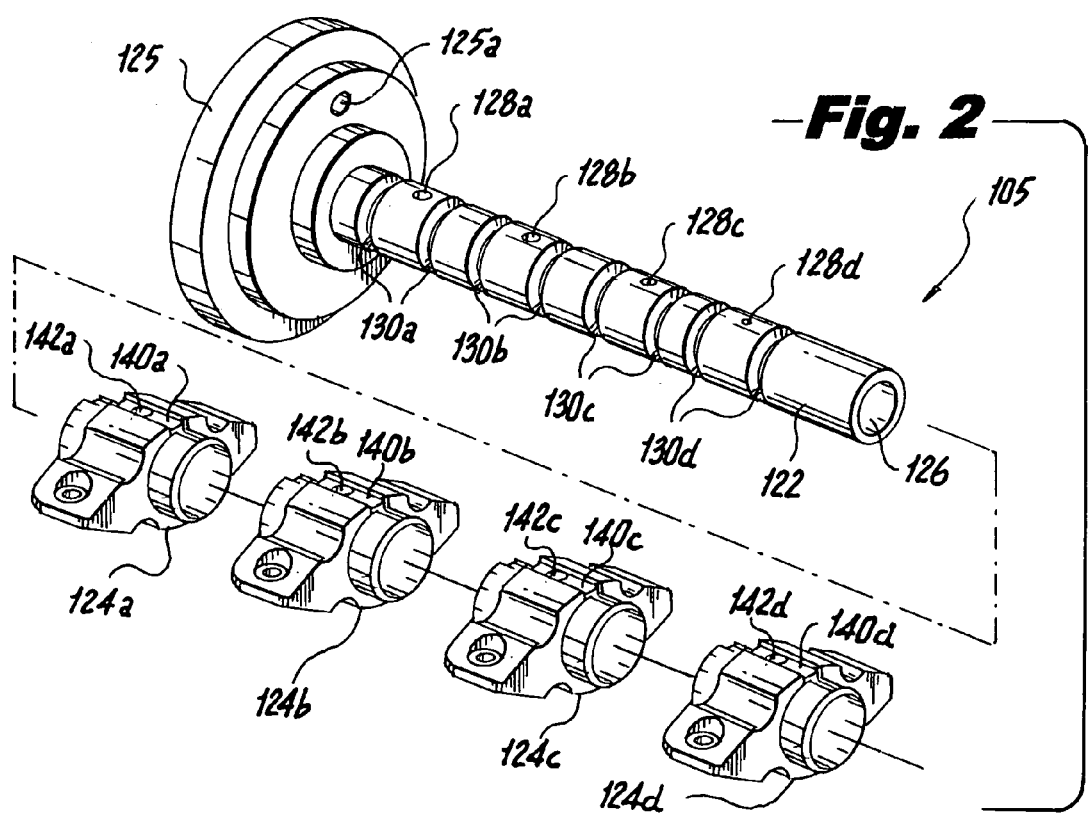

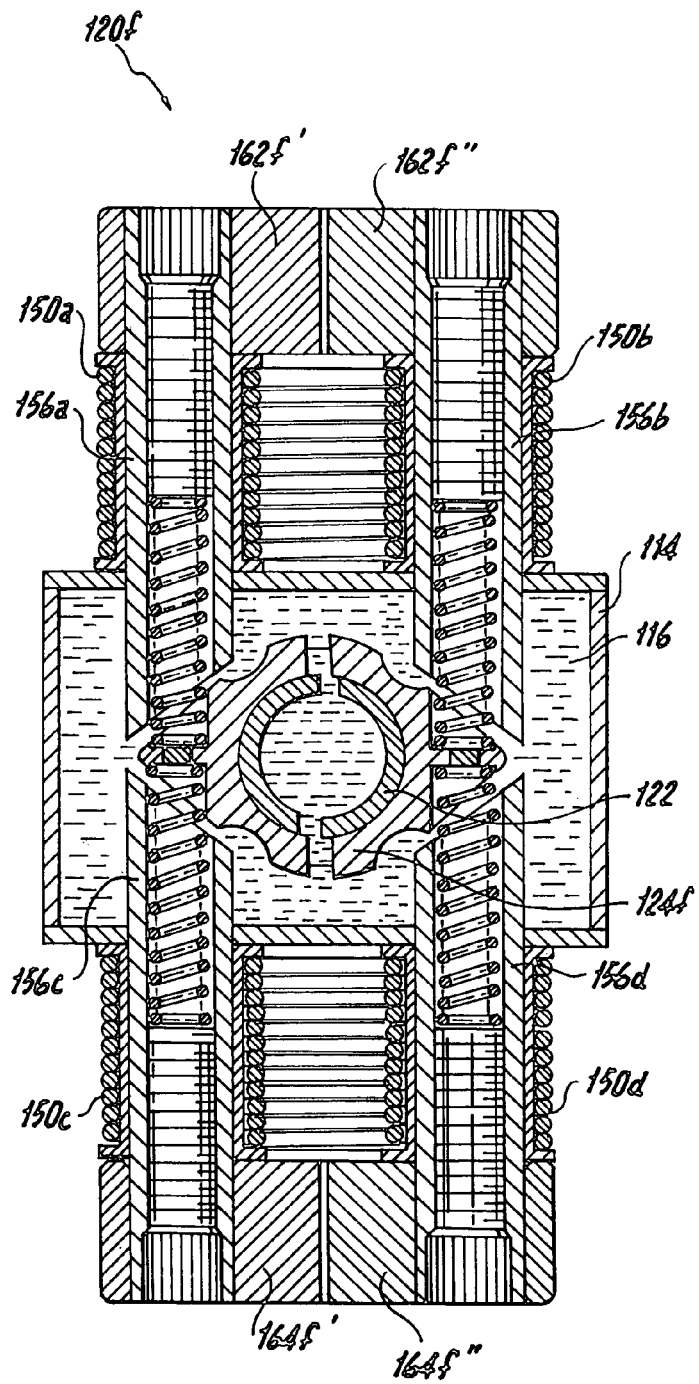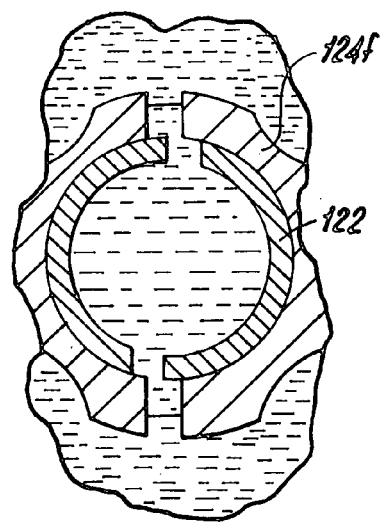
Fig. 13
Fig. 14

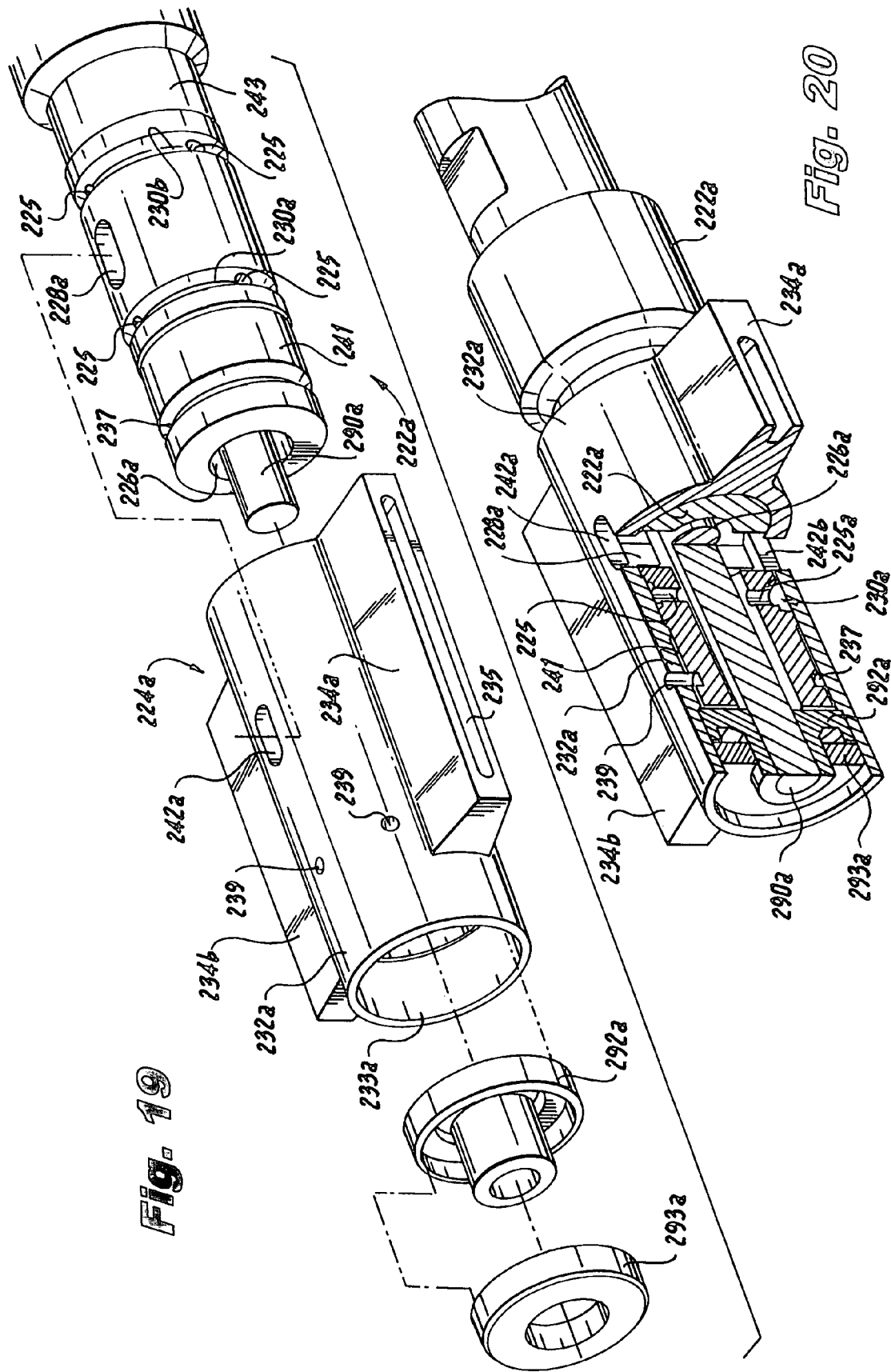

VALVE ASSEMBLY FOR MODULATING FUEL FLOW TO A GAS TURBINE ENGINE

BACKGROUND OF THE INVENTION

1. Field of the Invention

The subject invention is directed to gas turbine engines, and more particularly, to a valve assembly for modulating the flow of fuel to the combustor of a gas turbine engine for actively controlling the combustion process to maintain combustion stability and otherwise optimize engine performance.

2. Background of the Related Art

Combustion instability is a significant problem in the design of low-emission, high performing combustion chambers for gas turbines. Combustion instability is generally understood as high amplitude pressure oscillations that occur as a result of the turbulent nature of the combustion process and the large volumetric energy release within the combustion chamber. Combustion instability diminishes engine system performance, and the vibrations resulting from pressure oscillations can damage hardware components, including the combustion chamber itself. Moreover, when the combustion heat release becomes in phase with and reinforces acoustic pressure waves, a thermo-acoustic instability results.

In the past, passive control methods were employed to correct combustion instability, including, for example, modifying the fuel injection distribution pattern, or changing the shape or capacity of the combustion chamber. Passive controls are often costly and limit combustor performance. More recently, active control methods have been used to correct combustion instability by modifying the pressure within the system. One way this can be done is by sensing the amplitudes and frequencies of acoustic pressure waves, and then modulating fuel injection at frequencies out of phase with the instabilities.

Currently, fuel injector flow rates are controlled by changing the fuel pressure feeding a common fuel manifold, with no individual control to each of the fuel injectors. For example, U.S. Pat. No. 6,672,071 discloses a combustion control system that includes a fuel pulsator communicating with a plurality of fuel injectors through a manifold. Fuel is pulsed to the injectors through the manifold at a frequency that promotes stable combustion.

Combustion stability could be achieved more effectively with active controls, if fuel flow could be modulated or pulsed at each fuel injector individually. Furthermore, if fuel flow could be pulsed to each fuel injector at high frequencies, the droplet size of fuel could be dramatically reduced, which would improve ignition and optimize engine performance.

It would be beneficial therefore, to provide a valve assembly for an active combustion control system for gas turbine engines, that is designed to modulate or otherwise command pulsed fuel flow to individual fuel injectors at relatively high frequencies on the order of 1000 Hz or more, so as to effectively stabilize combustion and otherwise optimize engine performance.

SUMMARY OF THE INVENTION

The subject invention is directed to a new and useful device for actively controlling fluid flow in a combustion system, and more particularly, to a unique valve assembly for modulating fuel flow to an individual fuel nozzle of a gas turbine engine to actively control combustion based on localized conditions detected within the engine's combustion chamber.

The valve assembly of the subject invention includes a valve housing having an inlet portion for receiving fuel from a fuel metering unit or other source at a given pressure and at an initial fuel flow rate, and an outlet portion for delivering fuel to a fuel nozzle at the initial fuel flow rate or at a modulated fuel flow rate depending upon a detected combustion condition, for example, a thermo-acoustic combustion instability resulting from pressure oscillations or a hot spot.

In instances where the valve assembly of the subject invention is employed to actively stabilize combustion, the fuel flow rate is modulated within a predefined range, preferably about an average fuel flow rate, in response to detected combustion instability. In instances where the valve assembly of the subject invention is employed to improve combustion efficiency by actively controlling the temperature pattern factor of the combustor, the fuel flow through the valve assembly can be maintained at a steady state flow rate, for example an average fuel flow rate, and can be actively decreased or otherwise modulated in response to a detected hot spot. Similarly, the fuel flow rate can be actively increased relative to a steady state flow rate in response to other detected combustion conditions, or to actively tune the engine over time.

The valve assembly of the subject invention further includes means disposed within the valve housing for modulating the flow rate of fuel delivered to the fuel nozzle based upon a detected combustion condition. In instances where the valve assembly is utilized to actively control combustion instabilities, the flow rate is modulated in proportion to the amplitude of detected combustion instabilities, preferably within a predetermined modulation range that extends between a minimum flow rate and the maximum flow rate.

Preferably, combustion instabilities and other combustion conditions are detected by a sensing device operatively associated with the combustion chamber of the engine, such as, an optical sensor that detects flame characteristics or a pressure sensor that detects pressure fluctuations within the combustion chamber. The sensor would communicate with a controller that commands the operation of the valve assembly. An example of a suitable optical sensing device for detecting combustion conditions is disclosed in U.S. Patent Application Publication No. 2005-0247066-A1, the disclosure of which is herein incorporated by reference in its entirety.

The means for modulating the flow rate of fuel delivered to a fuel injector includes at least one valve rotor that is mounted for oscillatory movement within the valve housing relative to a stator. In operation, the valve rotor moves between a first latched position wherein modulating fuel is admitted into the outlet portion of the valve housing and a second latched position wherein modulating fuel is not admitted into the outlet portion of the valve housing.

The valve rotor is formed from a ferritic magnetic flux permeable material, and is mounted for oscillatory movement within the valve housing between first and second magnetically latched positions. Similarly, the stator is also preferably formed from a ferritic magnetic flux permeable material. Therefore, the stator and rotor define a variable magnetic flux path within the valve assembly.

The means for modulating the flow rate of fuel further includes electromagnetic means for alternately latching the valve rotor in the first and second magnetically latched positions, and spring means for rapidly moving or otherwise accelerating the valve rotor from one magnetically latched position to another magnetically latched position.

Preferably, the valve rotor is mounted for oscillatory movement on an elongated valve shaft disposed within the valve housing. The valve rotor and valve shaft have corresponding fuel ports that are arranged so that when the valve rotor is in the first magnetically latched position, the fuel ports of the valve rotor communicate with the fuel ports of the valve shaft, and when the valve rotor is in the second magnetically latched position, the fuel ports of the valve rotor do not communicate with the fuel ports of the valve shaft.

The fuel ports in the valve shaft communicate with a fuel passage formed on the interior of the valve shaft so that when the valve rotor is in the first magnetically latched position, modulating fuel flows into the fuel passage in the valve shaft and is conducted to the outlet portion of the valve housing. When the valve rotor is in the second magnetically latched position, modulating fuel does not flow into the fuel passage. Preferably, the valve rotor is adapted for movement into a neutral position when the electromagnetic means are de-energized, such as in the event of a loss of power, so as to achieve a mean fuel flow condition that promotes safe engine operation.

The spring means for alternately moving or otherwise accelerating the valve rotor from one magnetically latched position to another magnetically latched position can take several different forms. For example, in one embodiment of the invention described herein, the spring means includes a plurality of coiled springs operatively associated with an exterior portion of the valve rotor. In another embodiment of the invention, the spring means includes a torsion spring operatively associated with an interior portion of the valve rotor. In yet another embodiment, the spring means includes a cantilever spring operatively associated with an exterior portion of the valve rotor. In accordance with the subject invention, the spring and rotor oscillate between magnetically latched positions at a natural frequency.

The electromagnetic means preferably includes alternating first and second magnetic flux paths. In accordance with the subject disclosure, the valve rotor rotates or otherwise moves in a first direction to the first magnetically latched position when the first magnetic flux path is energized and the valve rotor rotates or otherwise moves in a second direction to the second magnetically latched position when the second magnetic flux path is energized.

In one embodiment of the subject invention, the electromagnetic means include adjacent first and second upper electromagnetic coils and adjacent third and fourth lower electromagnetic coils. The first and third electromagnetic coils horizontally oppose one another and the second and fourth electromagnetic coils horizontally oppose one another, relative to a horizontal plane that extends through an axis of the valve shaft about which the valve rotor is mounted for oscillatory movement. The valve rotor moves in a first direction to the first magnetically latched position when the first and fourth electromagnetic coils are energized, and it moves in a second direction to the second magnetically latched position when the second and third electromagnetic coils are energized.

It is envisioned that the two alternating magnetic flux paths associated with the horizontally opposed electromagnetic coils can vary depending upon design choice. For example, it is envisioned that the two alternating flux paths could include a common radial return pole (e.g., a pole having an axis that lies within the same plane as the axes of the electromagnetic coils), a common axial return pole (e.g., a pole having an axis that extends perpendicular to the axes of the electromagnetic coils) or no common return pole at all. It is further envisioned and well within the scope of the subject disclosure that the electromagnetic means could include only two electromagnetic coils positioned beside one another or horizontally opposed to one another, in which cases there would be a single electromagnetic coil in each flux path. In such an instance, there may be no common return pole. In instance where there is no common return pole, the magnetic flux path may be defined by independent structural components of the valve housing.

The valve rotor has a generally cylindrical body portion configured for mounting on the valve shaft, and it has a pair of diametrically opposed paddles that extend radially outwardly from the body portion to interact with the electromagnetic means. Preferably, annular grooves are formed about the circumference of the valve shaft, in communication with the interior fuel passage formed therein, to establish a fluidic bearing between the exterior surface of the valve shaft and the interior surface of the cylindrical body portion of the valve rotor. The fluidic bearing supports rapid oscillatory movement of the valve rotor, reducing the frictional surface contact between the shaft and the rotor.

Preferably, to achieve a high degree of flow rate resolution within the modulation range of the device, a plurality of valve rotors are arranged within the valve housing, and each valve rotor is adapted and configured to produce a unique fuel flow condition relative to the valve shaft, in dependence upon the size of the corresponding fuel ports associated therewith. In one embodiment of the invention, four valve rotors are arranged within the valve housing, with each rotor producing a unique fuel flow condition, so that in total, for a single pressure, sixteen different fuel flow rates can be obtained within the range between the initial flow rate and the maximum flow rate. In one configuration of the valve assembly, the four valve rotors are mounted on a single valve shaft in axial succession, and in another configuration each of the four valve rotors are mounted on a separate valve shaft, with the separate valve shafts arranged in parallel.

The subject invention is further directed to a new and useful method for controlling the flow of fuel to a fuel nozzle to actively control combustion in an engine. The method includes the steps of receiving fuel at an initial flow rate, modulating the flow rate of the fuel in response to a detected combustion condition, and delivering the fuel to a fuel injector at the modulated flow rate.

The subject invention is further directed to a method for modulating the flow of fuel to a fuel nozzle to actively control combustion instabilities in a gas turbine engine. The method includes the steps of receiving fuel at an initial flow rate, modulating the initial flow rate of the fuel in proportion to an amplitude of a detected combustion instability, and delivering the fuel to a fuel injector at the modulated flow rate to correct the combustion instability. This method further includes the steps of detecting combustion instability within the combustion chamber of a gas turbine engine and commanding the valve assembly to modulate the fuel flow rate in proportion to the amplitude of the combustion instability.

These and other aspects of the latching oscillating valve assembly of the subject invention and methods of employing the same will become more readily apparent to those having ordinary skill in the art from the following detailed description of the invention taken in conjunction with the drawings.

BRIEF DESCRIPTION OF THE DRAWINGS

So that those having ordinary skill in the art to which the present invention pertains will more readily understand how to employ the oscillating latching valve assemblies of the present invention, embodiments thereof will be described in detail hereinbelow with reference to the drawings, wherein:

FIG. 1 is a perspective view of a first type of oscillating latching valve assembly constructed in accordance with a preferred embodiment of the subject invention, wherein four sets of electromagnetic coils are shown in a four rotor configuration;

FIG. 2 is a perspective view of the valve shaft that defines the primary fuel conduit of the valve assembly of FIG. 1, and the four valve rotors that are rotatably supported on the valve shaft;

FIG. 13 is a cross-sectional view of an alternative embodiment of the valve assembly of FIG. 5, wherein the valve stator housing is without common radial stator poles to reduce the overall weight of the valve assembly;

FIG. 14 is an enlarged localized view of the valve rotor shown in FIG. 13 in a neutral position corresponding to a mean fuel flow condition;

FIG. 19 is an exploded perspective view of the valve rotor and valve shaft shown in FIG. 18, with the torsion spring disposed within the central bore of the valve shaft;

FIG. 20 is an assembled perspective view in partial cross-section of the valve rotor and valve shaft of FIG. 19, illustrating the relationship between the two cooperating structures;

DETAILED DESCRIPTION OF THE PREFERRED EMBODIMENTS

Figure 3:
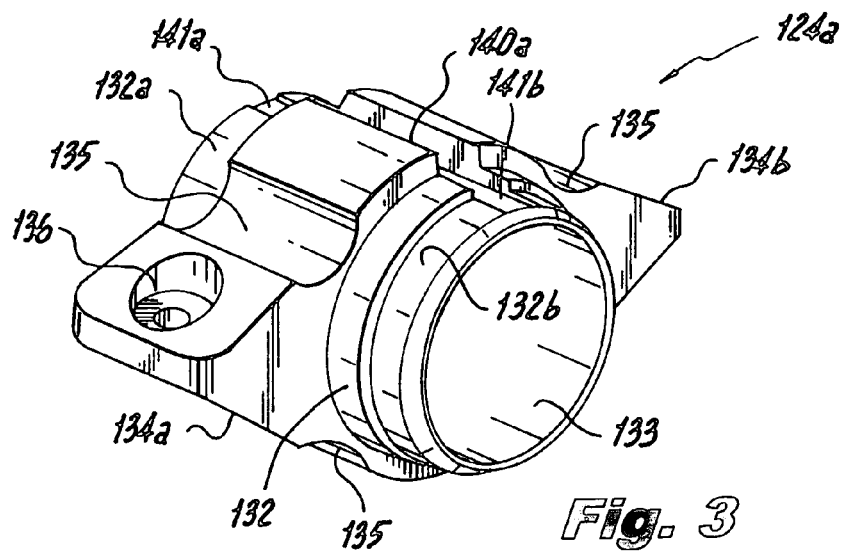
FIG. 3 is a perspective view of a valve rotor of the rotor assembly of FIG. 1.

The latching oscillating valve assemblies disclosed herein are intended for use in conjunction with an active combustion control system. Preferably, the active combustion control system is designed to reduce localized thermo-acoustic combustion instabilities within the combustion chamber of a gas turbine engine. In such instances, the valve assemblies disclosed herein can be employed to pulsate or otherwise modulate fuel flow to individual fuel injectors at extremely high frequencies in excess of about 1000 Hz in proportion to detected combustion instability.

The active combustion control system is also intended to lower engine emissions, improve engine dynamics and maximize operating efficiency. In such instances, the valve assemblies of the subject invention can be employed to trim or otherwise actively adjust fuel flow to individual injectors to control the temperature pattern factor in a combustor and thereby reduce hot spots and other detected combustion conditions. The valve assemblies could also be employed to self-tune an engine by actively adjusting localized fuel flow patterns over time, to maintain engine health.

It is envisioned that the valve assemblies disclosed herein could be used in conjunction with various types of fuel injectors, including for example, a two-stage fuel injector having main and pilot fuel flows. In such instances, the pilot fuel flow can be modulated or otherwise pulsed at high frequency relative to the main fuel flow to control combustion conditions.

Those skilled in the art will readily appreciate that the latching oscillating valve assemblies disclosed herein can be readily used in combustion applications outside the field of gas turbine technology. For example, the valve assemblies of the subject invention could be employed as pulse width modulation valves such as those that are found in automotive fuel injection systems.

Indeed, it is envisioned that the valve assemblies of the subject invention could be readily employed to modulate or otherwise pulse fluid flow at relatively high frequency in systems or processes outside the field of combustion technology. For example, valve assemblies as disclosed herein could find utility in applications within the chemical processing industry, such as, in fluid titration systems wherein a first process fluid is proportionally metered into a second process fluid in conjunction an active process control system. Other applications outside the field of combustion technology may include servo-vales for hydraulic systems or gaseous flow control valves in refrigeration systems.

In the description that follows, three different types of latching oscillating valve assemblies are disclosed for use in conjunction with an active combustion control system. Each valve assembly has a different construction, but all three function in a similar manner to actively control or otherwise modulate the flow of fuel to a fuel injector issuing fuel to the combustor of a gas turbine engine. The basic operational similarity between the three valve assemblies is that the valve members operate at a resonance frequency to minimize energy requirements. As will be discussed in more detail below, the energy used to oscillate a valve member of a disclosed valve assembly between operational positions is stored in a mechanical spring. The type of spring and the relative configuration of the valve assembly is what make each of the three valve assemblies different from one another.

In addition, the three valve assemblies are similar in that each valve member reverts to a mean or neutral fuel flow condition if there is a loss of power, and each valve assembly is designed so that the mean fuel flow does not shift when flow is modulated. In operation, the fuel modulation that is achieved by the valve assemblies of the subject invention is proportional to the amplitude of the combustion instability that is present in the combustor during operation. The amplitude of fuel modulation or the fuel flow rate is varied using multiple valve units operating in concert with each other, with each valve member in a particular valve assembly having a distinct fuel flow. The oscillation frequency of a valve member is varied by adjusting the time period during which the valve member is magnetically latched in an operational position, and phase is shifted by timing the release of the valve member from a latched position.

The three valve assemblies are designed to operate at a temperature of about 230° C. and at a very high operational frequency of about 1000 Hz or greater. The valves preferably have an operational life of about 30 billion cycles (i.e., 17,000 operational hours at 500 Hz). The valve assemblies have a maximum power consumption of about 40 Watts, and are designed to modulate 200 pph of fuel with at least a 1000 pph mean fuel flow. The valve assemblies are designed with fluidic or hydraulic bearings so that there is no metal-to-metal contact or friction with respect to the oscillating valve components and they have a mass that is preferably less than about 250 grams.

These and other features of the valve assemblies of the subject invention will become more readily apparent to those having ordinary skill in the art from the following detailed description of the preferred embodiments of the subject invention taken in conjunction with the drawings.

Latching Oscillating Valve Assembly With Coil Springs

A latching oscillating valve assembly having coil spring actuated valve members constructed in accordance with a preferred embodiment of the subject invention is illustrated in FIGS. 1 through 14 and is designated generally by reference numeral 100. Valve assembly 100, as discussed in more detail below, is illustrated and described as a four-bit valve assembly. In other words, the valve assembly is designed in a digital format in which each valve rotor operates in a binary or bit-like manner, having an open (or on) position and a closed (or off) position. Thus, as explained below, valve assembly 100 has four valves and sixteen ($2^4$) different operating positions to produce sixteen different fuel flow conditions for a single fuel flow pressure, providing a substantial degree of resolution to actively control combustion conditions.

However, those skilled in the art will ready appreciate from the following disclosure, that valve assembly 100 can be configured to produce a greater number of fuel flow conditions, to provide higher resolution and more precise control over the fuel flow conditions. For example, the valve assembly could be constructed as a six-bit system producing sixty-four ($2^6$) different fuel flow conditions. Conversely, the valve assembly can be configured to produce a fewer number of fuel flow conditions, to provided more gross control. For example, valve assembly 100 could simply comprise a one-bit system having two ($2^1$) distinct operating positions including a fully open position and a fully closed position, or a true binary valve.

Referring now to FIG. 1, valve assembly 100 has an inlet end portion 110 for receiving fuel upon demand from a fuel source, such as a fuel pump or fuel-metering device (not shown). Fuel is received by the inlet end portion 110 at a given pressure and at an initial flow rate. Valve assembly 100 also has an outlet end portion 112 that defines an annular fuel chamber 112a for delivering fuel to a fuel injection device (not shown). Fuel may be delivered from fuel chamber 112a at the initial fuel flow rate received at the inlet end portion 110 or at a modulated flow rate that differs from the initial flow rate. The modulated fuel flow rate is preferably within a predefined flow rate modulation range or regime, which extends between a minimum fuel flow rate (wherein the valve rotors are all fully closed) and a maximum fuel flow rate (wherein the valve rotors are all fully open) and preferably varies about an average fuel flow rate for the valve assembly.

In applications in which valve assembly 100 is employed to control combustion instabilities, the flow rate is modulated at a high frequency (pulsed fuel flow) so that the modulated flow rate is proportional to the amplitude of detected combustion instabilities. In applications in which valve assembly 100 is employed to control the thermal pattern factor within a combustion chamber of a gas turbine engine, the fuel flow rate can be actively adjusted or otherwise trimmed up or down relative to a steady-state or average fuel flow condition, to reduce or otherwise moderate a detected hot spot or the like. In such instances, the flow rate could be stepped up or down from a first steady-state condition corresponding, for example, to the valve assembly being in a neutral position to another steady-state condition in which the flow rate is increased or decreased relative to the flow rate obtained by having the valve assembly in a neutral position.

Valve assembly 100 includes four latching oscillating valve units or bits, which are arranged in longitudinal succession from the inlet end portion 110 to the outlet end portion 112. The valve units are housed within a valve casing 114 that defines an interior fuel chamber 116 (see e.g., FIG. 5). Fuel chamber 116 conveys by-pass flow (i.e., the primary fuel flow that by-passes the valve units) from the inlet end portion 110 to the outlet end portion 112. For ease of reference, the four valve units or bits of valve assembly 100 shall be designated in succession as valve units 120a through 120d.

As discussed in more detail below with respect to various drawings, each valve unit 120a-120d of valve assembly 100 includes, among other things, a valve rotor formed from flux permeable material and mounted for oscillatory movement on an elongated valve shaft between an open position and a closed position; two pairs of horizontally opposed electromagnets positioned in a manner so as to define diametrically opposed magnetic poles for magnetically latching the valve rotor in either the open position or the closed position depending upon which pair of electromagnets is energized; and four coil springs which provide the mechanical energy needed to accelerate or otherwise rapidly move the valve rotor between the open and closed positions when the valve member is unlatched from one diagonally opposed pair of electromagnets and attracted toward another diagonally opposed pair of electromagnets. The natural frequency of the valve rotor or the switching rate is preferably on the order of about 1000 Hz or more. It should be understood by those skilled in the art that the sole function of the electromagnets is the latching of the rotor, whereas the sole function of the coil springs is the rapid movement of the rotor between latched positions.

Referring to FIG. 2, valve assembly 100 includes a four-bit rotor assembly 105 consisting of an elongated cylindrical valve shaft 122 extending from an inlet plate 125 and forming a fuel tube or conduit. The inlet plate 125 has an axially offset fuel inlet port 125a, which delivers fuel into the primary fuel chamber 116 from the fuel source at a given pressure. Four rotatably supported valve rotors 124a-124d are supported on the valve shaft 122 in axial succession. Valve shaft 122 has a central fuel passage 126 that communicates with a series of four longitudinally spaced apart pairs of diametrically opposed radial fuel ports 128a through 128d.

In the disclosed embodiment of the valve assembly, the aperture size of the paired fuel ports 128a-128d decreases from the inlet end of fuel passage 126 to the outlet end of fuel passage 126, so that the inlet end fuel ports 128a have the largest relative aperture size and the outlet end fuel ports 128d have the smallest relative aperture size. More particularly, in accordance with the subject invention, as viewed in a downstream direction, from the inlet end to the outlet end, each successive pair of fuel ports in valve shaft 122 provides half the flow area of the next successive pair of opposed fuel ports. Thus, the flow area of fuel port pair 128b is half the flow area of fuel port pair 128a, the flow area of fuel port pair 128c is half the flow area of fuel port pair 128b, and the flow area of fuel port pair 128d is half the flow area of fuel port pair 128c. Those skilled in the art will readily appreciate that the aperture size and associated flow area of the fuel port pairs can vary from the presently disclosed configuration depending upon design choice and application. For example, each successive pair of opposed fuel ports could provide one-third the flow area of the next successive pair of opposed fuel ports, if required by a particular application. Alternatively, the flow areas of the fuel ports could be distributed along the valve shaft in an indiscreet manner.

Valve shaft 122 also includes four pairs of longitudinally spaced annular grooves 130a-130d. The annular groove pairs 130a-130d are in fluid communication with the central fuel passage 126 of valve shaft 122, as will be described in more detail below. Thus, each pair of annular grooves 130a-130d carries a given amount of fuel to form a fluidic bearing at or adjacent to each groove that supports the rotation of a respective valve rotor 124a-124d of rotor the assembly relative to the outer circumferential surface of valve shaft 122. This serves to reduce the surface-to-surface contact between the valve rotors and the valve shaft.

With continuing reference to FIG. 2 in conjunction with FIG. 3, each valve rotor 124a-124d of valve assembly 100 has a central cylindrical body portion 132 with reduced diameter end portions 132a, 132b and a bore 133 that is dimensioned and configured to receive the valve shaft 122 in rotationally supporting relationship. Each valve rotor 124a-124d has a pair of laterally opposed wing portions 134a, 134b with sloping latching surfaces that are adapted and configured to cooperate with horizontally opposed latching surfaces of the four electromagnets. Each of the latching surfaces of wing portions 134a, 134b has a countersunk seat 136 to accommodate the end portion of a respective coil spring (not shown).

Recesses 135 are formed in the surfaces of the wing portions 134a, 134b to reduce the overall weight of the valve rotor and to accommodate the relative movement of the rotors with respect to adjacent stator structures located within the valve casing 114. The opposed wings 134a and 134b of each rotor 124a-124d are separated from one another by diametrically opposed longitudinally extending paired fuel feed slots 140a-140d. The opposed fuel feed slots in each valve rotor 124a-124d are dimensioned and configured to communicate with the main interior fuel chamber 116 of valve casing 114 (see FIG. 5). More particularly, as best seen in FIG. 3, each longitudinally extending fuel feed slot (i.e., slot 140a) has structurally unobstructed opposed end sections 141a, 141b respectively formed within the diametrically reduced body end sections 132a, 132b, which are in continuous fluid communication with the main interior fuel chamber 116. Thus, during operation, the fuel feed slots in the valve rotors are always filled with fuel for immediate admission into the fuel passage 126 of valve shaft 122 upon demand.

Figures 5, 6:
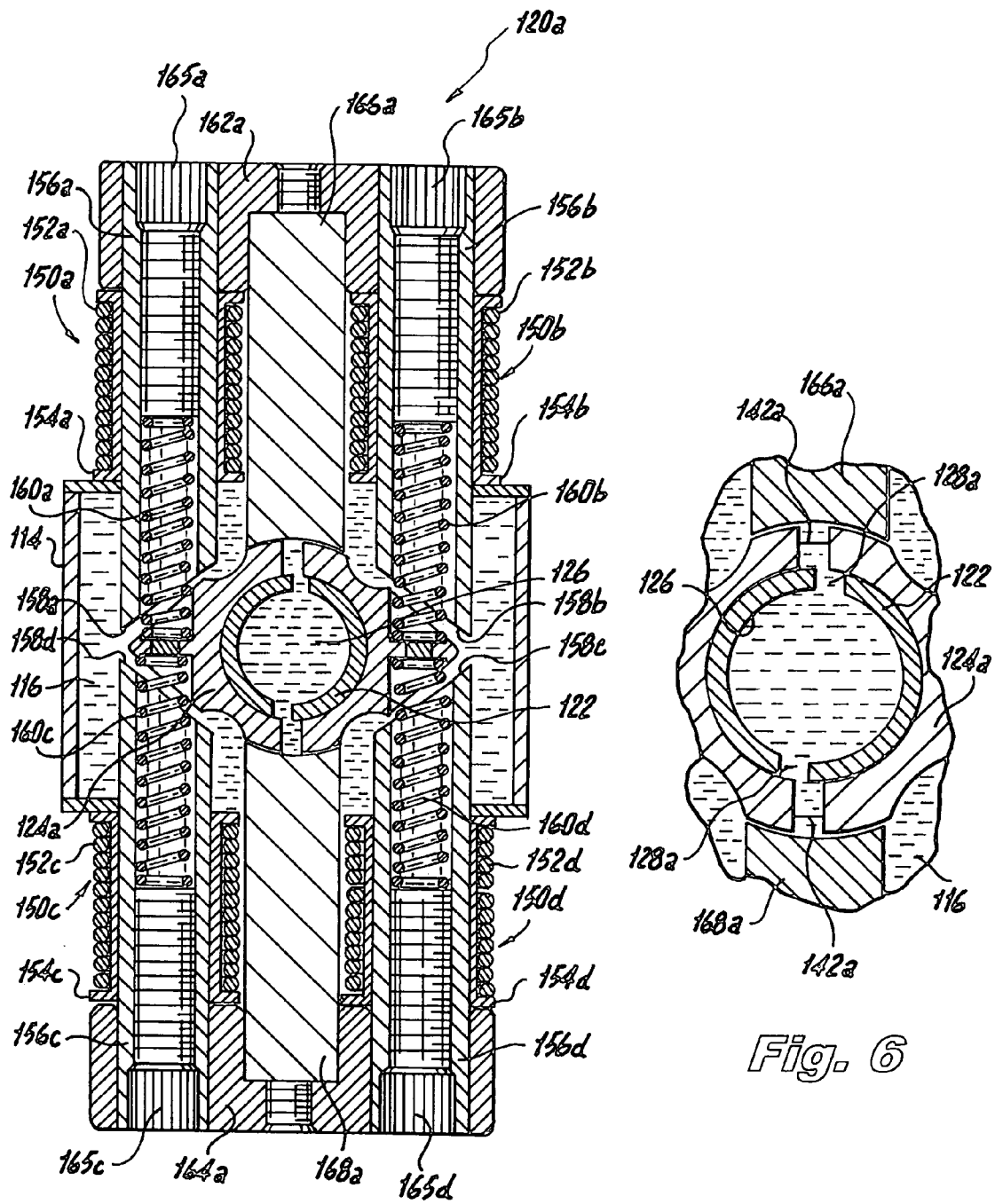
FIG. 5 is a cross-sectional view taken along line 5-5 of FIG. 1 illustrating the first valve rotor of the four-rotor assembly in a neutral unlatched position, which corresponds to mean fuel flow condition within the valve assembly.
FIG. 6 is an enlarged localized view of the valve rotor in the position shown in FIG. 5, illustrating the relative positions of the opposed fuel transfer ports in the valve rotor and the opposed fuel inlet ports in the valve shaft, when the valve rotor is in a neutral position.

Referring to FIGS. 2 and 5, formed within the fuel feed slot pairs 140a-140d of valve rotors 124a-124d are diametrically opposed paired fuel feed ports 142a-142d that are dimensioned and configured to cooperate with the corresponding diametrically opposed paired fuel port 128a-128d formed in valve shaft 122. Thus, for each successively positioned valve rotor, the aperture size of the paired fuel feed ports 142a-142d decreases from the inlet end of the valve shaft to the outlet end of the valve shaft. More particularly, the valve rotor located closest to the inlet end of the valve shaft (i.e., valve rotor 124a) has the largest fuel feed ports, which the valve rotor closest to the outlet end of the valve shaft (i.e., valve rotor 124d) has the smallest fuel feed ports. These aperture size differentials correspond directly to the aperture size differentials of the diametrically opposed fuel inlet port pairs formed in valve shaft 122, with each successive pair of fuel feed ports providing half the flow area of a preceding pair of fuel feed ports. Those skilled in the art will readily appreciate that the size and/or dimensions of the fuel ports in the valve rotors could vary in the manner described above with respect to the fuel ports in the valve shaft.

Figure 4:
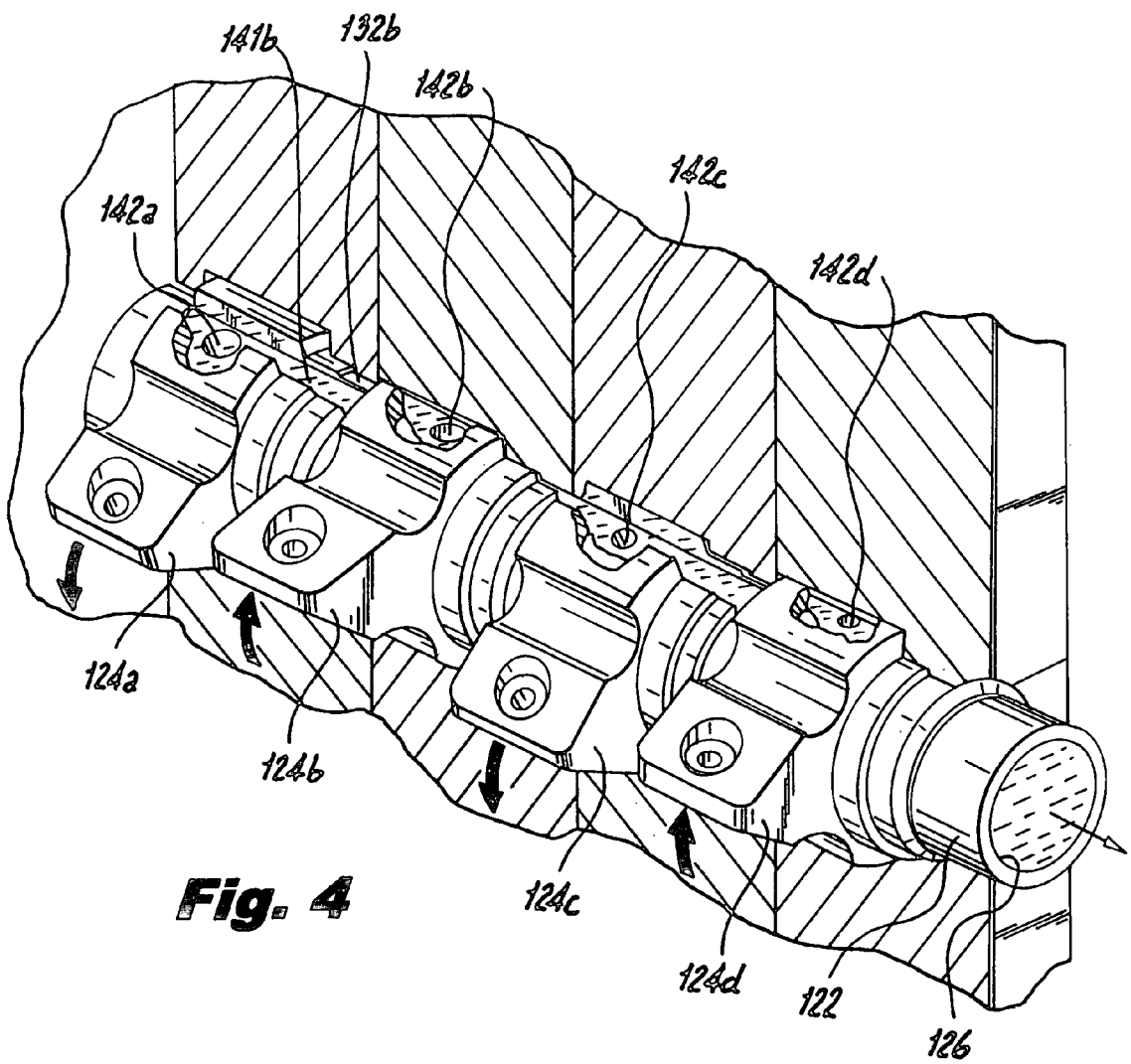
FIG. 4 is a perspective view in cross-section, of a portion of the valve assembly of FIG. 1, wherein the four valve rotors of the rotor assembly are positioned in a manner to achieve a desired modulated fuel flow condition, wherein the first and third valve rotors are rotated in a first or counter-clockwise direction to a closed position and the second and fourth rotors are rotated in a second or clockwise direction to an open position.

As best shown in FIG. 4, in a manner described in more detail below, the valve rotors 124a-124d oscillate between magnetically latched open and closed positions about the outer periphery of valve shaft 122. This enables the paired fuel feed ports 142a-142d in the valve rotors 124a-124d to move into and out of fluid communication with the corresponding paired fuel port 128a-128d formed in valve shaft 122 (see FIG. 2), so as to actively modulate the amount of fuel flowing through the central fuel passage 126 of valve shaft 122.

Thus, with reference to FIGS. 1 and 2, as fuel flows at a given pressure and at an initial flow rate from the fuel inlet port 125a of inlet plate 125, into the interior fuel chamber 116 of casing 114, through the fuel outlet port 125b of outlet end portion 112 and into the outlet chamber 112a, the four valve assembly 105 can be operated, preferably at a high frequency (e.g., 1000 Hz or more) to modulate the flow rate of the fuel delivered to a fuel injector within a predetermined modulation range. This is achieved by delivering a demanded amount of modulating fuel from fuel chamber 116 of casing 114 (see FIG. 5) into the outlet chamber 112a of outlet end portion 112 by way of the central fuel passage 126 of valve shaft 122. The demanded amount of modulating fuel from the central fuel passage 126 of valve shaft 122 merges with the primary (or by-passed) fuel flow from the outlet port 125b of interior fuel chamber 116 within the outlet chamber 112a of outlet end portion 112. This merged or combined modulated fuel flow is then delivered from outlet chamber 112a to a fuel injector communicating with valve assembly 100.

More particularly, when the four valve rotors 124a - 124d of the rotor assembly 105 are all magnetically latched in a closed position, so that there is no fluid communication between the fuel feed port pairs 142a-142d of valve rotors 124a-124d and the fuel port pairs 128a-128d of valve shaft 122, the fuel flow rate through the valve assembly 100 corresponds to the minimum fuel flow rate for the system. In contrast, when the four valve members 124a-124d of the four-bit rotor assembly 105 are all magnetically latched in an open position, so that there is complete fluid communication between the fuel feed port pairs 142a-142d of valve rotors 124a-124d and the fuel port pairs 128a-128d of valve shaft 122, the fuel flow rate through valve assembly 100 corresponds to the maximum fuel flow rate for the system.

It follows therefore, that in any commanded combination of valve rotor positions, of which there are fourteen in a four valve assembly, in addition to the fully open position and the fully closed position, the flow rate of fuel delivered to a fuel injector associated with the valve assembly will vary between the minimum and maximum fuel flow rates, within a predefined flow rate modulation range. Preferably, the modulated fuel flow rate varies about an average fuel flow rate for the system.

Those skilled in the art will readily appreciate that the magnitude of the fuel modulation range can vary depending upon the operating conditions of the fuel control system and the engine with which the valve assembly is employed. For example, the valve assembly could be designed so that the fuel rate modulation range would be about 30%. It is also envisioned that resolution within the modulation range of the valve assembly can be increased relative to a four-bit valve assembly by providing additional valve units in accordance with the above teachings. Thus, for example, a six-bit valve assembly having six valve rotors of varying flow area could produce sixty-four different fuel flow conditions for a single pressure.

An example of an intermediate fuel modulation condition for the four-valve assembly 100 is shown in FIG. 4. In this instance, the first valve rotor 124a and the third valve rotor 124c are latched in an open position (see also FIGS. 7-9), while the second valve rotor 124b and the fourth valve rotor 124d are latched in a closed position (see also FIGS. 10-12). Consequently, fuel is delivered through the fuel feed ports 142a and 142c of valve rotors 124a and 124c, respectively, to the correspondingly positioned fuel inlet ports 128a and 128c and into the fuel passage 126 of valve shaft 122, whereas fuel is not delivered through the fuel feed ports 142b and 142d of valve rotors 124b and 124d to the correspondingly positioned fuel inlet ports 128b and 128d of fuel tube 122.

The exemplary valve arrangement illustrated in FIG. 4 could correspond to a commanded operating condition in which the amount of modulating fuel admitted into the fuel passage 126 of valve shaft 122 by valve rotors 124a, 124c is proportional to detected combustion instability within the combustion chamber of the gas turbine engine with which the valve assembly is associated. In which case, the valve would open or close at a commanded frequency out of phase with the instability.

Alternatively, the exemplary valve arrangement of FIG. 4 could correspond to a steady-state reduced or trimmed fuel flow condition relative to a steady-state or average fuel flow condition, which is commanded in response to a detected hot spot in the combustion chamber. It follows too, that the exemplary valve arrangement could correspond to an increased fuel flow condition relative to a steady state or average fuel flow condition, which corresponds to a demanded fuel flow condition needed to tune the engine relative to a detected combustion condition. Those skilled in the art will readily appreciate that although the valve assembly of the subject invention can be utilized to pulse or otherwise modulate fuel at high frequencies, it may also be used to modulate fuel flow by stepping from one steady-state fuel flow condition to another steady state fuel flow condition.

Referring now to FIG. 5, by way of example, valve unit 120a includes four electromagnets 150a-150d that are individually connected to a source of current. Each electromagnet includes a coiled winding 152a-152d supported on a bobbin 154a-154d and surrounding a magnetic pole piece 156a-156d. Diagonally opposed pole pieces define coordinating magnetic flux paths, such that pole pieces 156a and 156d define part of a first magnetic flux path, and pole pieces 156b and 156c define part of a second magnetic flux path that is distinct from the first. The magnetic pole pieces 156a-156d each define a sloping magnetic latching surface 158a-158d for interacting magnetically with the sloping latching surfaces of the laterally opposed wings 134a, 134b of valve rotor 124a, as described in more detail hereinbelow.

Each of the four valve units or bits 120a-120d of valve assembly 100 also includes four coil springs 160a-160d, which are individually supported within corresponding pole pieces 156a-156d. The inward end portion of each coil spring 160a-160d is accommodated or otherwise supported within the corresponding countersunk seats 136 formed in the latching surfaces of the opposed wings 134a, 134b of the valve rotor 124a. The coil springs are maintained within the pole pieces by respective threaded fasteners 165a-165d. Coil springs 160a-160d store mechanical energy to accelerate or otherwise move the valve rotor 124a between open and closed magnetically latched positions, as described in more detail hereinbelow.

In FIG. 5, valve rotor 124a is depicted in an unlatched neutral position, which occurs if there is a loss of power and none of the four electromagnets 150a-150d associated with the valve rotor are energized. This condition corresponds to a mean fuel flow condition for valve unit 120a, wherein the valve rotor 124a is partially open, as best seen in FIG. 6. Consequently, in the unlikely case of a power failure, the flow of fuel through valve assembly 100 will be maintained at a reliable level, since the opposed fuel feed ports 142a of the valve rotor 124a are partially aligned with the opposed fuel inlet ports 128a in valve shaft 122, and combustion will continue to take place in the engine. This condition will occur in each valve unit 120a-120d so that a mean or neutral flow rate will be attained for valve assembly 100.

Figure 7:
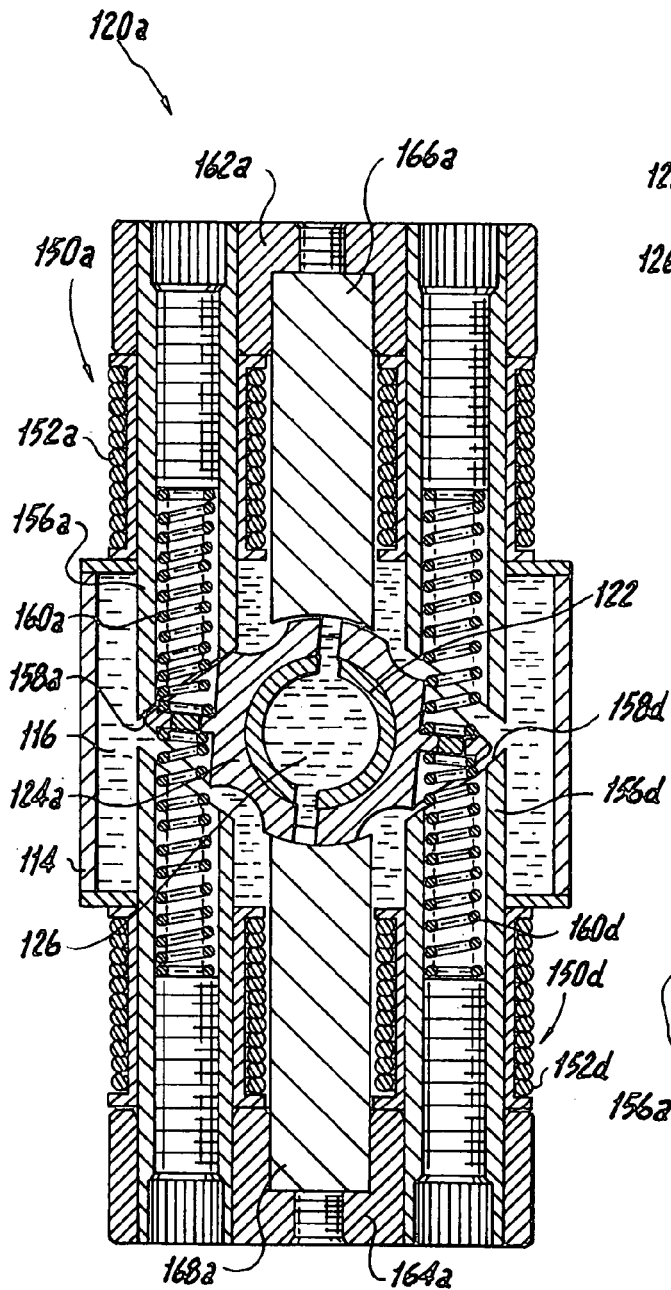
FIG. 7 is a cross-sectional view of the valve of the four rotor assembly taken along line 5-5 of FIG. 1, illustrating the first valve rotor magnetically latched in a fully open position with the diagonally opposed first and third second coil springs compressed to store mechanical energy to accelerate the valve rotor towards the closed position of FIG. 10.
Figure 8:
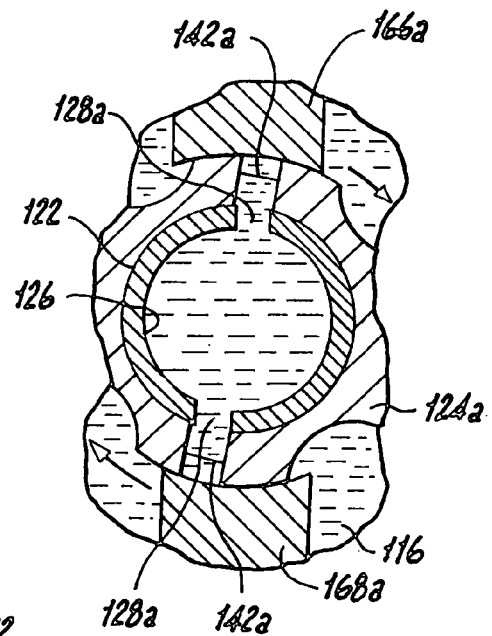
FIG. 8 is an enlarged localized view of the valve rotor as in FIG. 7, illustrating the relative positions of the opposed fuel transfer ports in the valve rotor and the opposed fuel inlet ports in the valve shaft, when the valve rotor is in an open position.
Figure 9:
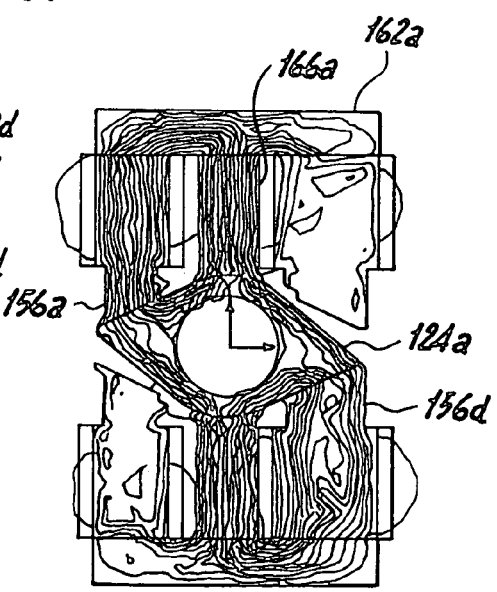
FIG. 9 is a schematic illustration of the magnetic flux lines flowing through the valve rotor and the upper and lower common radial stator poles of the valve housing to magnetically latch the valve rotor in the open position of FIGS. 7 and 8.

Referring to FIGS. 7 through 9, valve unit 120a is shown with the valve rotor 124a in an open position. When the valve rotor 124a is in this open position, it is rotated in a first direction (e.g., a clockwise direction) from the partially open/closed neutral position shown in FIG. 5. Accordingly, the opposed fuel feed ports 142a of valve rotor 124a are wholly aligned with the opposed fuel inlet ports 128a of valve shaft 122, as best seen in FIG. 8, so that a demanded amount of modulating fuel can flow from the interior fuel chamber 116 of valve casing 114 into the fuel passage 126 of valve shaft 122. In this position, the electromagnets 150a and 150d of valve unit 120a are energized so that valve rotor 124a is magnetically latched with respect to the diagonally opposed latching surfaces 158a and 158d of pole pieces 156a and 156d, respectively. In this instance, as depicted in FIG. 9, the magnetic flux field that serves to latch the valve rotor 124a in the open position flows between diagonally opposed pole pieces 156a and 156d by traveling through a path defined in large part by the valve rotor 124a itself, an upper end cap 162a, a lower end cap 164a, an upper central stator 166a and a lower central stator 168a.

When the valve rotor 124a is magnetically latched in this open position, diagonally opposed coil springs 160a and 160d are compressed, thus storing mechanical energy. The stored mechanical energy in coil springs 160a and 160d is sufficient to accelerate or otherwise rapidly move the valve rotor 124a toward the closed position of FIG. 10 when it is unlatched and diagonally opposed electromagnets 150b and 150c are concomitantly energized. This oscillation occurs at the natural frequency of the rotor and spring system. The torque produced by the coil springs 160a and 160d in a compressed state is not sufficient however, to overcome the magnetic latching forces holding the valve rotor 124a in the open position of FIG. 7.

Figure 10:
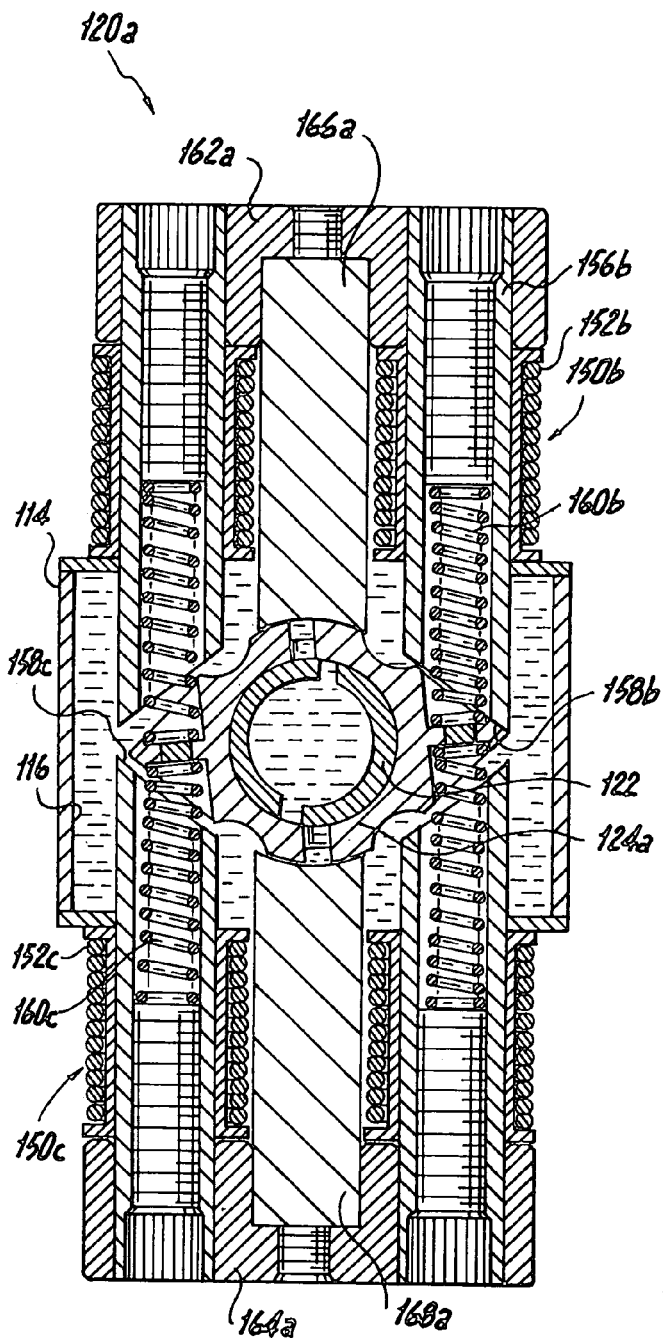
FIG. 10 is a cross-sectional view of the valve of the four rotor assembly taken along line 5-5 of FIG. 1, illustrating the first valve rotor magnetically latched in a fully closed position with the diagonally opposed second and fourth coil springs compressed to store mechanical energy to accelerate the valve rotor towards the open position of FIG. 7.
Figure 11:
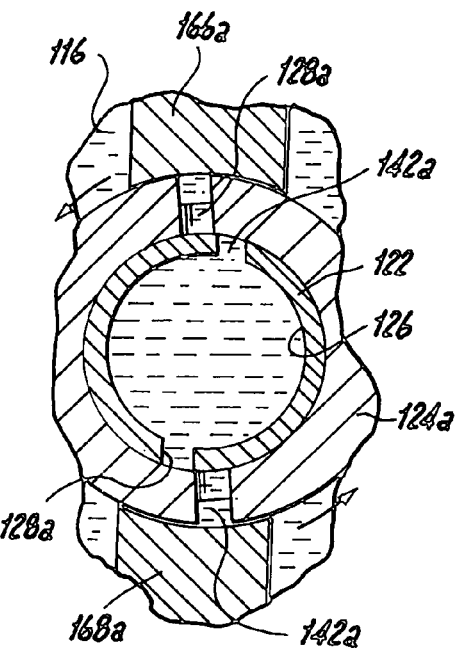
FIG. 11 is an enlarged localized view of the valve rotor as in FIG. 10, illustrating the relative positions of the opposed fuel transfer ports in the valve rotor and the opposed fuel inlet ports in the valve shaft, when the valve rotor is in a closed position.
Figure 12:
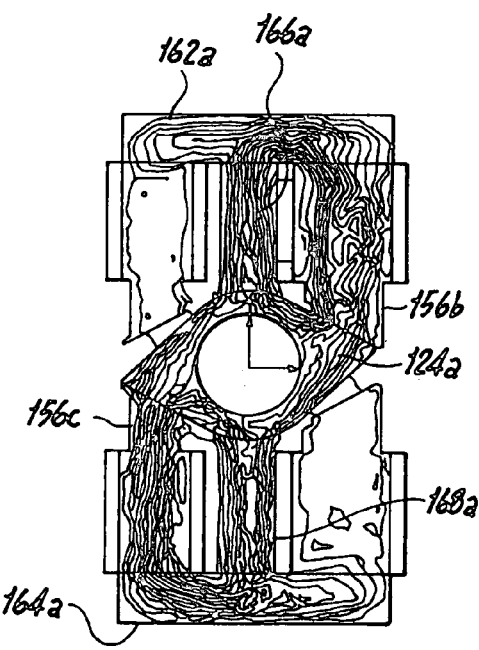
FIG. 12 is a schematic illustration of the magnetic flux lines flowing through the valve rotor and the upper and lower common radial stator poles of the valve housing to magnetically latch the valve rotor in the closed position of FIGS. 9 and 10.

Referring now to FIGS. 10 through 12, valve unit 120a is shown with the valve rotor 124a in a closed position. When the rotor 124a is in this closed position, it is rotated in a second direction (e.g., a counter-clockwise direction) from the neutral position shown in FIG. 5. Accordingly, the opposed fuel feed ports 142a of valve rotor 124a are not in fluid communication with the opposed fuel inlet ports 128a in valve shaft 122, as shown in FIG. 11, so modulating fuel cannot flow from the interior fuel chamber 116 to the fuel passage 126 of valve shaft 122. In this position, the diagonally opposed electromagnets 150b and 150c are energized so that valve rotor 124a is magnetically latched with respect to the diagonally opposed latching surfaces 158b and 158c of pole pieces 156b and 156c, respectively. In this instance, as depicted in FIG. 12, the magnetic flux field that serves to latch the valve rotor 124a in the open position, flows between pole pieces 156b and 156c by traveling through a path defined by the valve rotor 124a itself, upper end cap 162a, lower end cap 164a, upper stator 166a and lower stator 168a.

When the valve rotor 124a is magnetically latched in this closed position, diagonally opposed coil springs 160b and 160c are compressed, thus storing mechanical energy. The stored mechanical energy in coiled springs 160b and 160c is sufficient to accelerate or otherwise rapidly move the valve rotor 124a toward the open position when it is unlatched and electromagnets 156a and 156d are concomitantly energized. The torque produced by the compressed coil springs 160b and 160c is insufficient however, to overcome the magnetic latching force holding rotor 124a in this closed position of FIG. 10.

Referring now to FIGS. 13 and 14, there is illustrated another embodiment of a coil spring actuated valve unit constructed in accordance with a preferred embodiment of the subject invention, which is designated generally by reference numeral 120f. Valve unit 120f is shown in a mean fuel flow position, wherein the valve rotor 124f is disposed in a partially open condition with respect to valve shaft 122. Valve unit 120f is substantially identical to valve units 120a-120d of valve assembly 100 in all respects, except that valve unit 120f does not include the upper and lower stators 166a, 168a of valve unit 120a, shown for example in FIG. 5.

In this instance, the magnetic flux path for both of the energized states of the electromagnets 150a-150d shown for example in FIGS. 9 and 12 is formed at least in part by the valve rotor 124f, and the end caps (162f', 162f'') and (164f', 164f'') and the pole pieces 156a-156d. More particularly, a first flux path is defined by diagonally opposed end caps 162f' and 164f'', diagonally opposed pole pieces 156a and 156d, and valve rotor 124f. A second flux path is defined by diagonally opposed end caps 162f'' and 164f', diagonally opposed pole pieces 156b and 156c, and valve rotor 124f. The remainder of the alternative flux paths, while not shown, may be formed by part of the valve casing or by other means such a flux permeable return straps. Consequently, the overall mass of valve unit 120f is reduced as compared to the mass of a valve 120a. It is also envisioned, although not shown herein, that a valve unit of the valve assembly can include only two electromagnets, as opposed to four. In such an instance, the magnetic flux path for each energized state would include only one electromagnet and associated pole piece. A respective structurally isolated portion of the valve casing, which communicates with a respective pole piece, would further define each magnetic flux path. The valve rotor would not form part of the flux path. This arrangement would further reduce the mass of the valve.

Latching Oscillating Valve Assembly With Torsion Spring

A latching oscillating valve assembly having torsion spring actuated valve members constructed in accordance with a preferred embodiment of the subject invention is illustrated in FIGS. 15 through 25 and is designated generally by reference numeral 200. Valve assembly 200 is illustrated and described as a two-valve (two-bit) assembly. Thus, as explained below, valve assembly 200 has eight different operating positions to produce four ($2^2$) different fuel flow conditions for a single fuel flow pressure. The two valve assembly 200 is adapted and configured to cooperatively join together with one or more additional two-bit valve assemblies, as shown for example in FIGS. 26 and 27, to produce sixteen or more different fuel flow conditions for a single fuel flow pressure, as explained in more detail hereinbelow.

Figure 15:
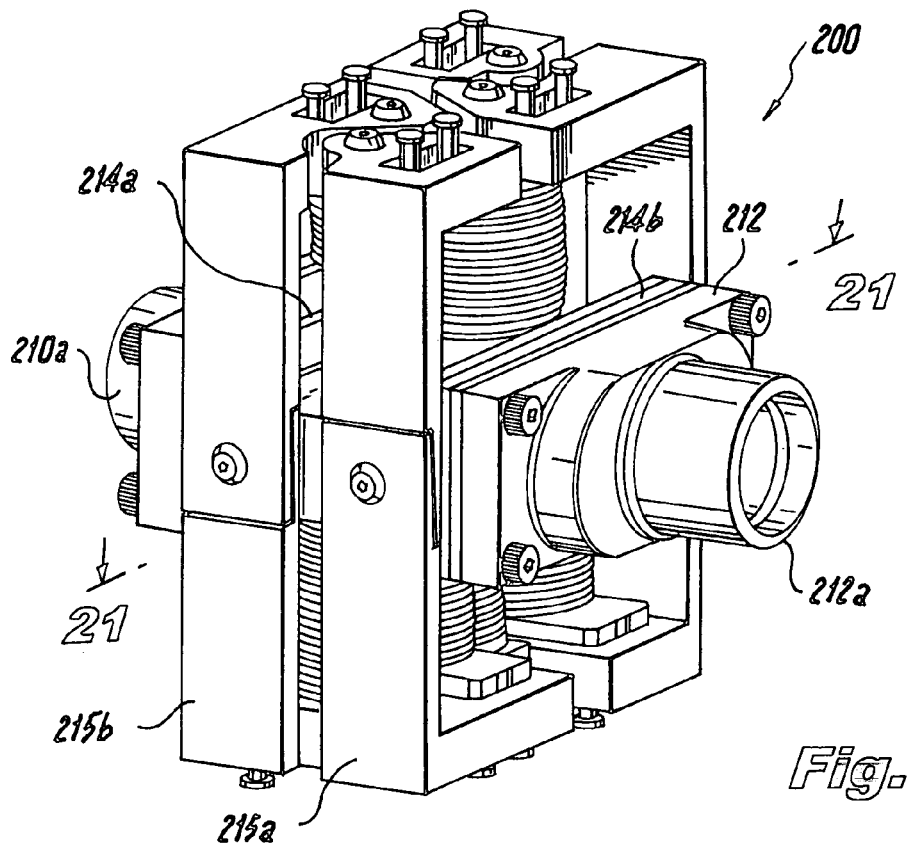
FIG. 15 is a perspective view of a second type of valve assembly constructed in accordance with a preferred embodiment of the subject invention.
Figure 16:
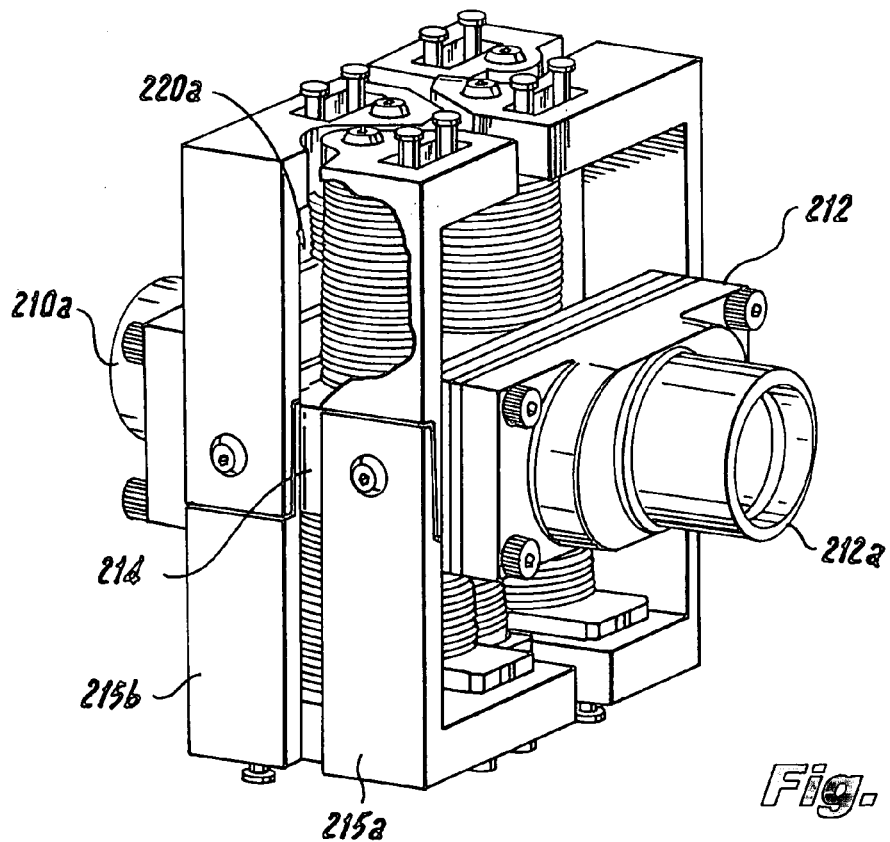
FIG. 16 is a perspective view of the valve assembly shown in FIG. 15, with the sidewall removed to illustrate several of the horizontally opposed electromagnets located within the interior of the valve casing.
Figure 17:
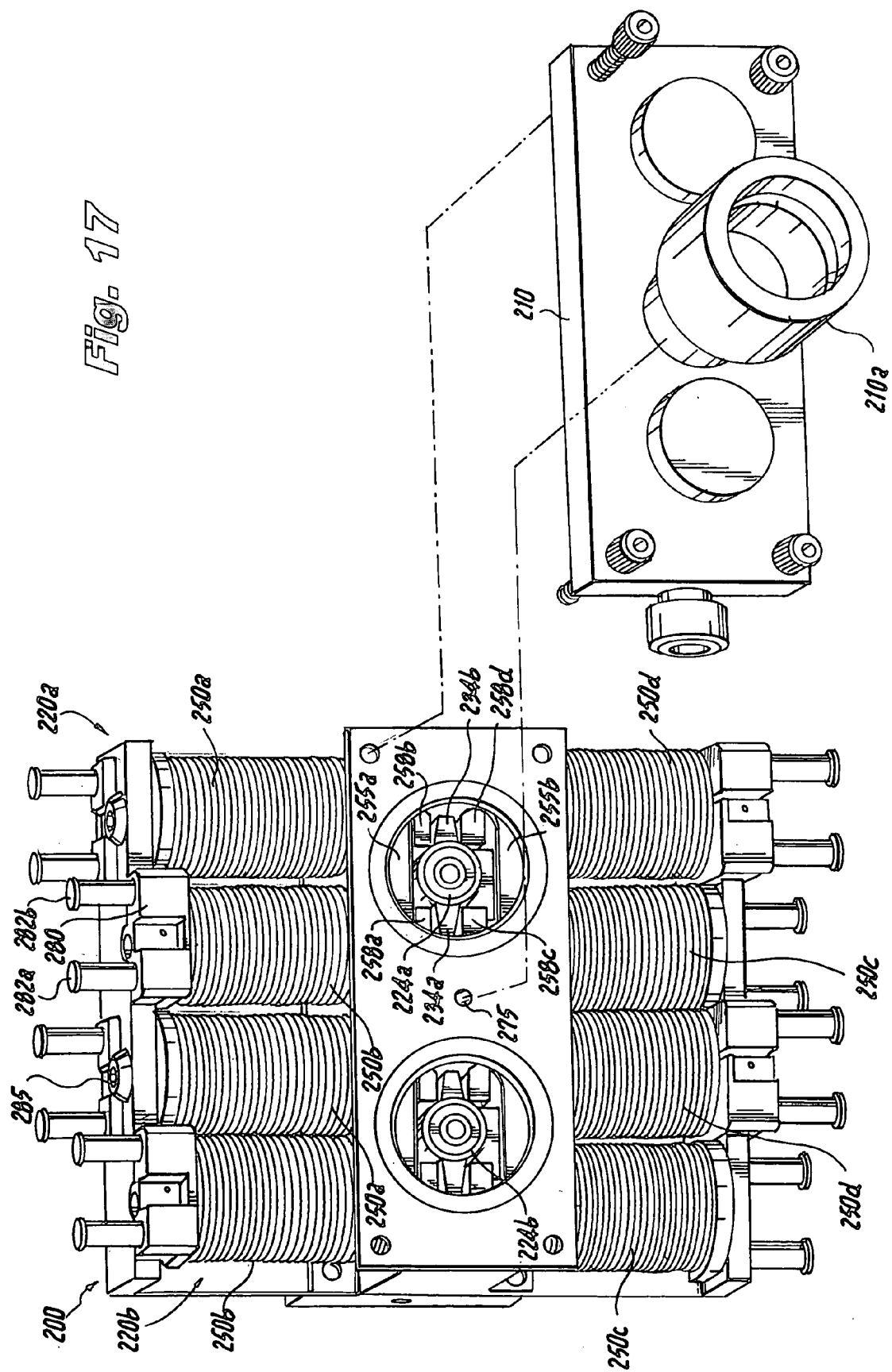
FIG. 17 is a perspective view of the valve assembly of FIG. 15, with the outlet plate removed to illustrate the valve rotors of the two-rotor assembly located within the valve casing.

Referring to FIGS. 15 through 17, valve assembly 200 includes two latching oscillating valve units 220a and 220b, which are arranged in coplanar parallel relationship with respect to one another. Valve units 220a and 220b are housed within a generally rectangular valve casing 214, that includes front and rear end plates 214a, 214b. Valve casing 214 is enclosed by spatially isolated return straps, such as return straps 215a, 215b of valve unit 220a, which form part of the magnetic flux paths associated with each valve unit described in more detail hereinbelow.

An inlet plate 210 is mounted to the inlet side of valve casing 214 adjacent front end plate 214a, and an outlet plate 212 is mounted to the outlet side of valve casing 214 adjacent rear end plate 214b. The inlet plate 210 includes an inlet fitting 210a for receiving fuel from a fuel pump or metering unit at a given pressure and at an initial flow rate. The outlet plate 212 includes an outlet fitting 212a for delivering fuel at the initial flow rate or at a modulated flow rate to a fuel injection device communicating with the combustor of a gas turbine engine.

Figure 18:
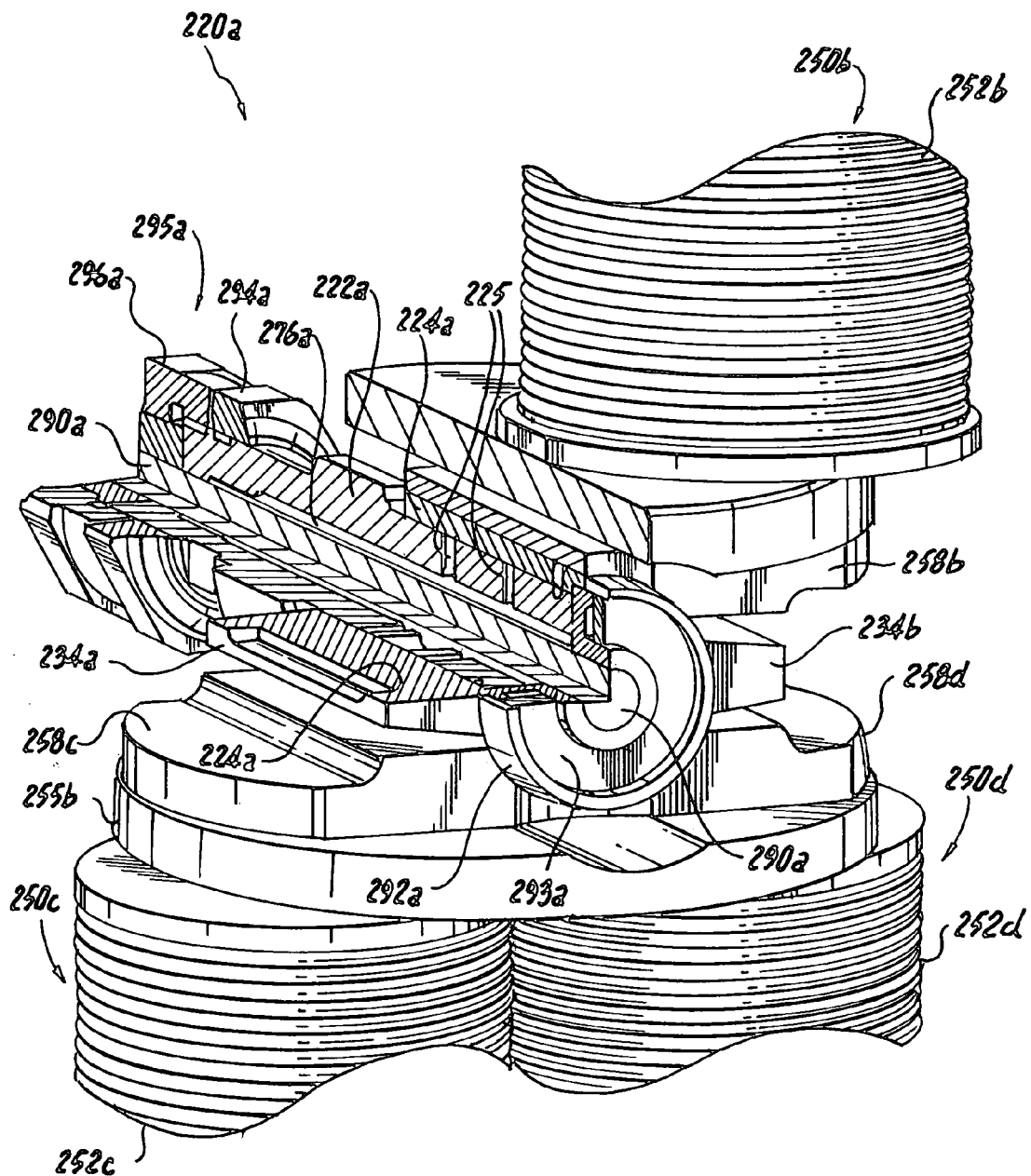
FIG. 18 is a perspective view of a valve rotor and associated valve shaft within the valve assembly of FIG. 15, with the valve rotor and valve shaft shown in cross-section to illustrate the torsion spring and passage provided within the valve shaft.

Referring now to FIGS. 17 and 18, in an exemplary non-limiting embodiment of the subject disclosure, each valve unit 220a, 220b of valve assembly 200 includes four electromagnets, including upper electromagnets 250a, 250b and lower electromagnets 250c, 250d. The upper electromagnets 250a, 250b are supported on an upper coil support plate 255a formed from a material that is not flux permeable. The lower electromagnets 250c, 250d are similarly supported on a lower coil support plate 255b, also formed from a material that is not flux permeable. Each electromagnet includes a coil winding 252a-252d surrounding a respective pole piece 256a-256b, and each pole piece 256a-256d has an associated latching surface 258a-258d (see FIGS. 22-24).

As shown in FIG. 17, the upper and lower electromagnets of each valve unit 220a, 220b are individually connected to a source of current through terminal mounts 280, with each terminal mount having a pair of wiring posts 282a, 282b for mounting conductive wires (not shown). Terminal mounts 280 are secured to respective pole pieces by way of threaded fasteners 285.

In valve assembly 200, as in valve assembly 100, diagonally opposed electromagnets define cooperating magnetic poles, which form part of the alternating magnetic flux paths. Thus, diagonally opposed electromagnets 250a and 250d define part of a first magnetic flux path, and diagonally opposed electromagnets 250b and 250d define part of a second magnetic flux path. The two flux paths that are associated with the two sets of diagonally opposed electromagnets also include spatially isolated flux permeable return straps 215a, 215b, respectively (see FIGS. 15 and 16).

The electromagnets 250a-250d of each valve unit are operatively associated with respective latching plates 258a-258d that interact magnetically with the diverging surfaces of the laterally opposed wings 234a, 234b of each valve rotor 224a, 224b, as shown in FIG. 17, for example. Elongated recesses 235 are formed in the opposed wings 234a, 234b of each valve rotor 224a to reduce the weight of valve rotor 224, as shown in FIGS. 18 and 19, for example.

Referring now to FIGS. 17 through 21, the valve rotors 224a, 224b of valve units 220a, 220b are mounted for oscillatory motion on a respective valve shaft 222a, 222b. By way of example, valve shaft 222a has a central bore or fuel passage 226a extending at least partially if not wholly therethrough. As shown in FIG. 19, a pair of longitudinally spaced apart annular grooves 230a, 230b are formed in the outer surface of fuel tube 222a. Grooves 230a, 230b are in fluid communication with the central bore 226a of valve shaft 222a through a plurality of circumferentially spaced apart radial passages 225. The annular grooves 230a, 230b receive fuel from central bore 226a to balance fluidic pressure differentials during operation.

In addition, as shown in FIG. 19, an annular fuel supply groove 237 is formed in the outer surface of fuel tube 222a. Supply groove 237 is in fluid communication with a plurality of circumferentially disposed fuel feed apertures 239, which are formed in the body 232a of valve rotor 224a. Fuel feed apertures 239 deliver fuel to the fuel supply groove 237, which in turn supplies fuel to a diametrically reduced annular bearing region 241. That fuel acts as a fluidic bearing to support the rotation of valve rotor 224a relative to valve shaft 222a. A similar fluidic bearing arrangement is established with respect to the diametrically reduced annular bearing region 243 of valve shaft 222a. Fuel is supplied to this region of the valve shaft 222a in a more direct manner through a dimensional clearance that exists between the valve shaft and rotor, which is not shown.

The central fuel passage 226a of valve shaft 222a also communicates with diametrically opposed radial fuel feed ports 228a, 228b that are formed in valve shaft 222a between the annular grooves 230a, 230b, as best seen in FIG. 20. Fuel feed ports 228a, 228b are dimensioned and positioned to communicate with corresponding diametrically opposed fuel inlet ports 242a, 242b formed in the cylindrical body portion 232a of valve rotor 224a, as described in more detail below with respect to FIGS. 22 through 24.

In accordance with the teachings of the subject invention, the aperture size of the opposed fuel feed ports 228a, 228b in valve shaft 222a and the corresponding fuel inlet ports 242a, 242b in the valve rotor 224a of valve unit 220a differ from the aperture size of the opposed fuel feed ports 228a, 228b in fuel tube 222b and the corresponding fuel ports 242a, 242 in the valve rotor 224b of valve unit 220b. For example, the size of the fuel ports differ such that the flow area provided by the corresponding rotor and shaft fuel ports in valve unit 220a is twice as great as the flow area provide by the corresponding rotor and shaft fuel ports in valve unit 220b.

Valve rotor 224a is operatively mounted to a cylindrical torsion spring 290a. Torsion spring 290a extends through the central bore 226a of valve shaft 222a. More particularly, the leading end of torsion spring 290a is brazed or otherwise fastened to an annular fitting 292a. Fitting 292a is secured within the central bore 233a of the cylindrical body portion 232a of valve rotor 224a by an annular locking ring 293a. Therefore, valve rotor 224a and torsion spring 290a will oscillate in conjunction with one another between magnetically latched positions. In operation, the oscillation of the conjoined torsion spring and valve rotor occurs at the natural resonant frequency of the system.

As best seen in FIG. 18, the trailing end of torsion spring 290a is operatively associated with an adjustable collet assembly 295a that includes hexagonally-shaped cooperating adjustable fasteners 294a, 296a for locking the trailing end of the torsion spring 290a to the valve shaft 222a. Preferably, the fasteners are designed to cooperate with the valve casing 214 to maintain the valve shaft 222a in a fixed axial position with respect to the valve rotor 224a. Furthermore, the cooperating fasteners 294a, 296a of the adjustable collet assembly 295a is adapted and configured to facilitate the proper alignment of torsion spring 290a relative to valve rotor 224a to obtain the appropriate spring bias necessary to achieve the requisite oscillatory acceleration from one magnetically latched portion to another.

Figure 21:
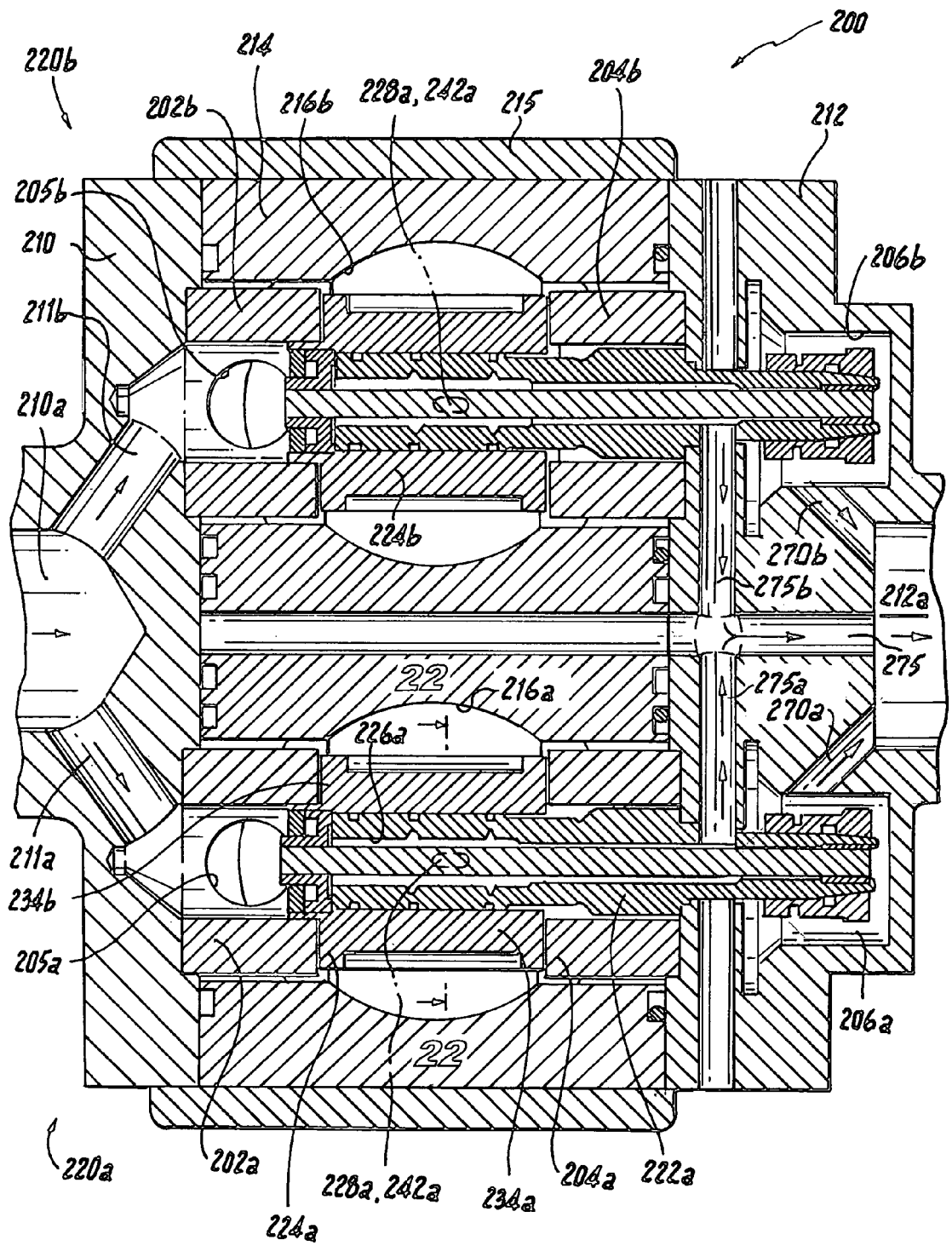
FIG. 21 is a cross-sectional view taken along line 21-21 of FIG. 15, illustrating the primary and modulating fuel flow passages defined within the valve casing that houses the two rotor assembly, whereby fuel enters the inlet plate at a given pressure and initial flow rate and exits the outlet plate at the given pressure and at the same or a modulated flow rate depending upon the positions of the valve rotors.

Referring to FIG. 21, both valve assemblies 220a, 220b are shown in parallel relationship within valve casing 214. The inlet port 210a of inlet plate 210 bifurcates into first and second diverging inlet passages 211a, 211b, which respectively feed fuel to valve units 220a, 220b, at an initial fuel flow rate. Inlet passage 211a communicates with a primary fuel chamber 216a of valve unit 220a through an aperture 205a in a forward flux permeable structure 202a, which forms an axial end pole.

Figure 22:
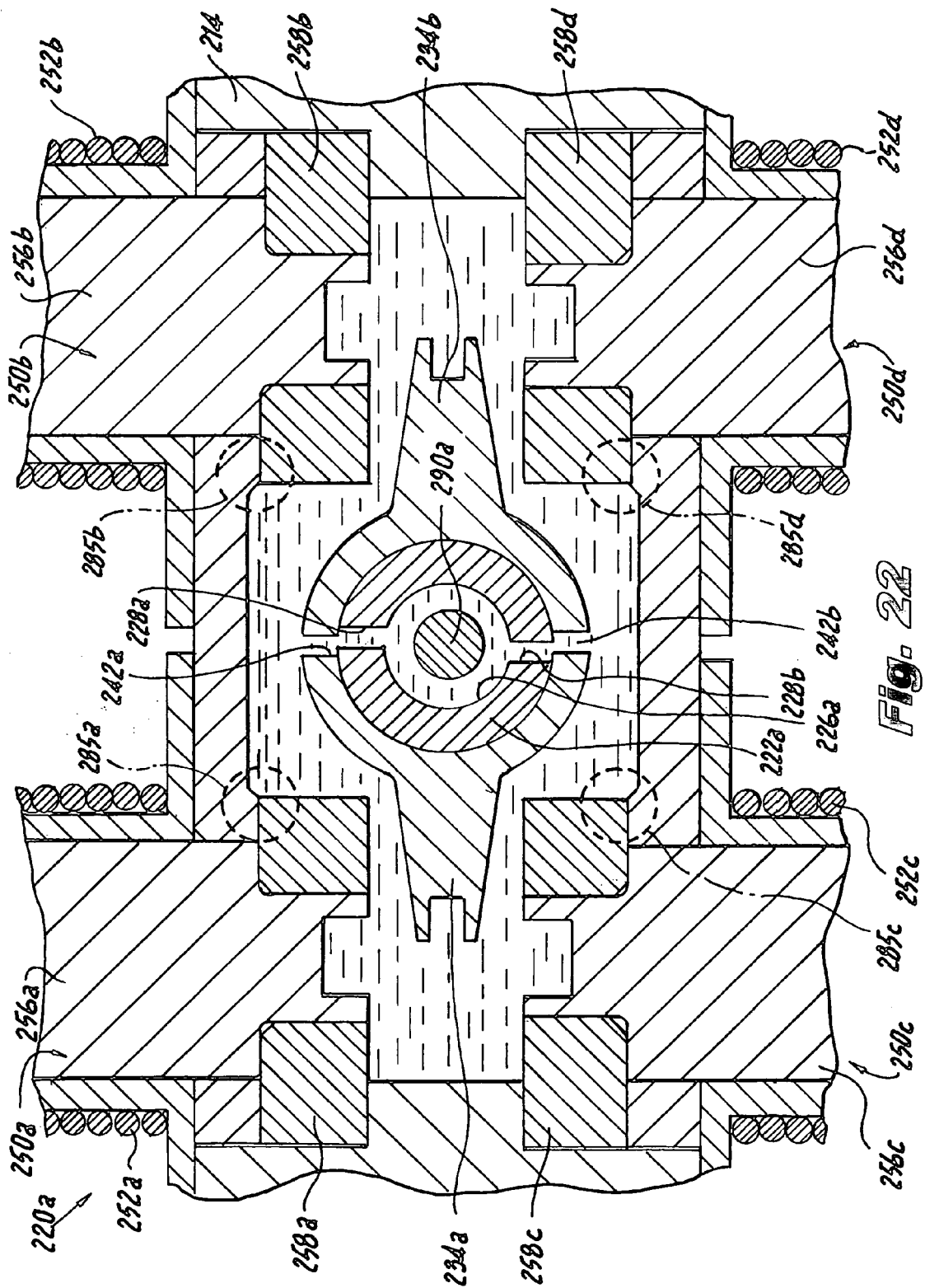
FIG. 22 is a cross-sectional view taken along line 22-22 of FIG. 21, illustrating the relative positions of the opposed fuel transfer ports in the valve rotor and the opposed fuel inlet ports in the valve shaft, when the valve rotor is in a neutral position.
Figure 23:
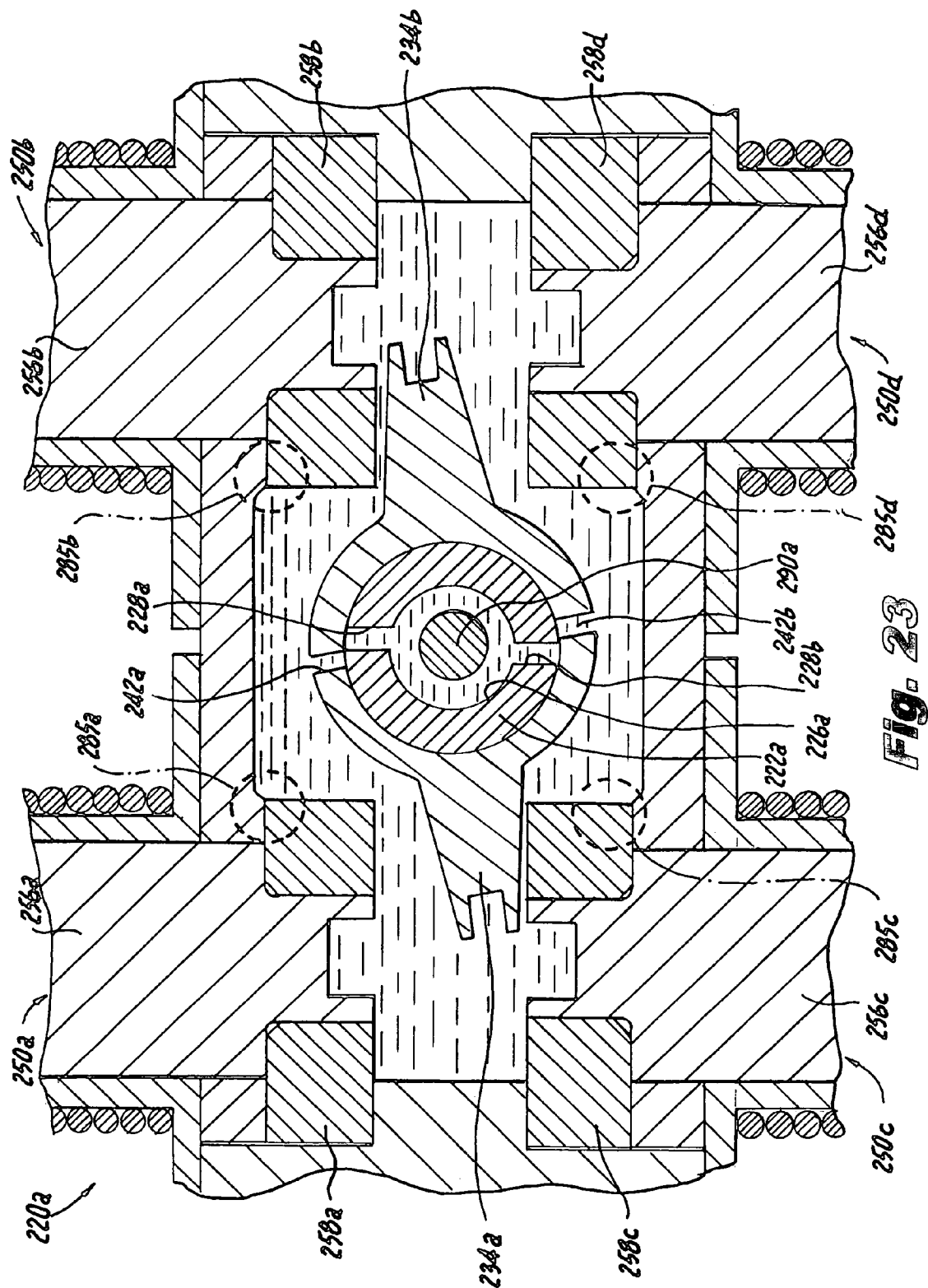
FIG. 23 is a cross-sectional view taken along line 22-22 of FIG. 21, illustrating the relative positions of the opposed fuel transfer ports in the valve rotor and the opposed fuel inlet ports in the valve shaft, when the valve rotor is magnetically latched in a fully closed position.
Figure 24:
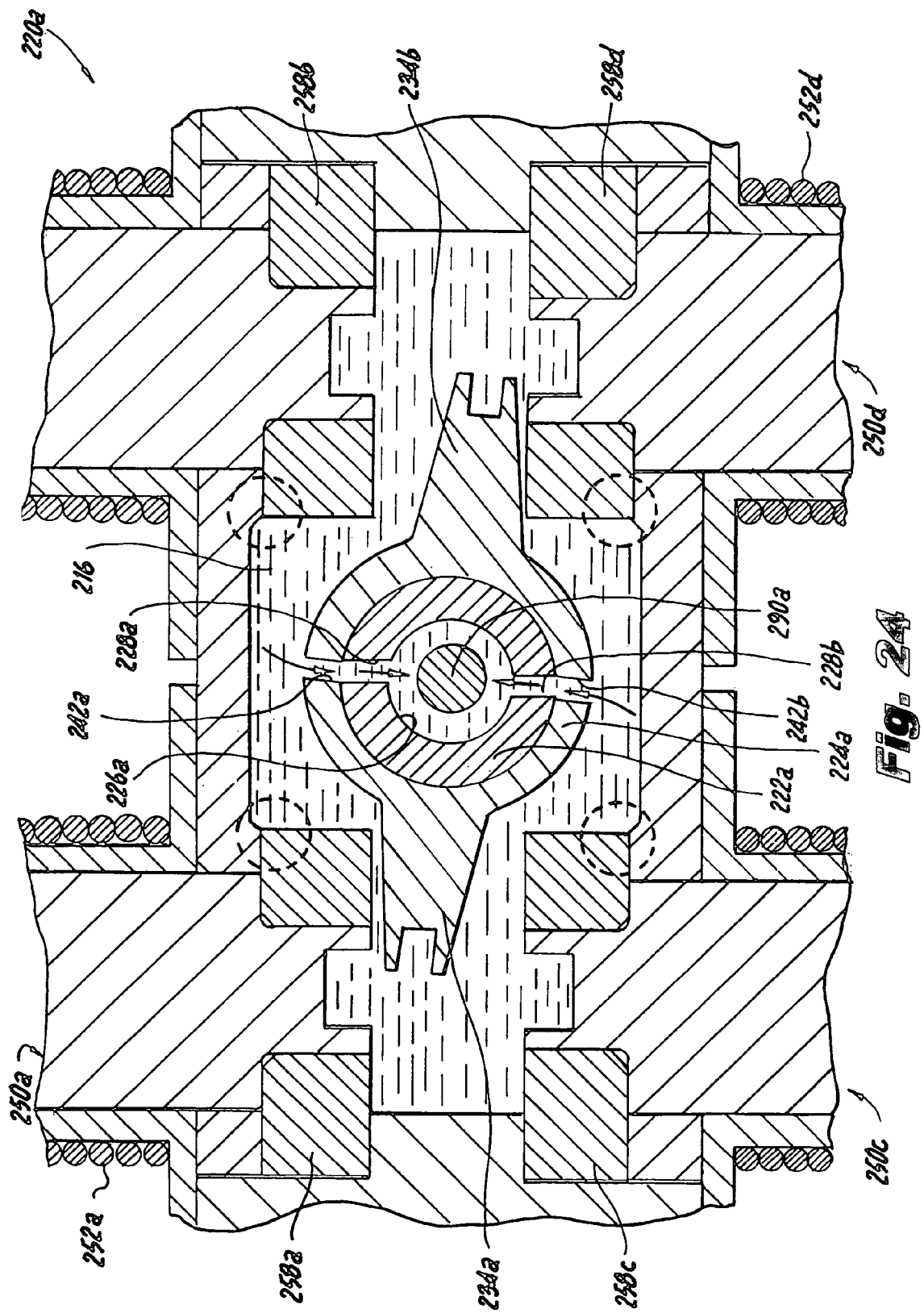
FIG. 24 is a cross-sectional view taken along line 22-22 of FIG. 21, illustrating the relative positions of the opposed fuel transfer ports in the valve rotor and the opposed fuel inlet ports in the valve shaft, when the valve rotor is magnetically latched in a fully open position.

As best seen in FIGS. 22-24, the primary fuel chamber 216a of valve unit 220a communicates with an outlet chamber 206a formed in outlet plate 212 through a set of four apertures 285a through 285d located behind flux permeable axial end pole 204a. These apertures supply the by-pass or primary fuel flow from fuel chamber 216a to outlet chamber 206a. The outlet chamber 206a of valve assembly 220a communicates directly with the outlet port 212a in outlet plate 212 through fuel passage 270a.

Similarly, inlet passage 211b communicates with a primary fuel chamber 216b defined in valve assembly 220b through an aperture 205b formed in forward flux permeable structure 202b. The primary fuel chamber 216b of valve assembly 220b communicates with an outlet chamber 206b formed in outlet plate 212 by way of apertures formed in outlet plate 212 behind flux permeable structure 204b axial end pole (as shown for example in FIG. 22). The outlet chamber 206b of valve assembly 220b communicates directly with the outlet port 212a in outlet plate 212 through fuel passage 270b.

Valve rotor 224a of valve assembly 220a is positioned within the primary fuel chamber 216a between the front and rear magnetic flux permeable structures 202a, 204a. In operation, when valve rotor 224a is in a fully open magnetically latched position, modulating fuel from the primary fuel chamber 216a is admitted into the central fuel passage 226a of valve shaft 222a, through the aligned fuel ports 228a, 242a of valve shaft 222a and valve rotor 224a, respectively. The central fuel passage 226a of valve shaft 222a communicates with a transverse secondary fuel channel 275a formed in outlet plate 212 for delivering modulating fuel to outlet port 212a by way of a central fuel feed channel 275.

The valve rotor 224b of valve unit 220b is similarly positioned within the primary fuel chamber 216b located between flux permeable axial end poles 202b and 204b. In operation, when valve rotor 224b is in a fully open magnetically latched position, modulating fuel from the primary fuel chamber 216b is admitted into the central fuel passage 226b in valve shaft 222b through the aligned fuel ports of valve shaft 222b and valve rotor 224b. The central fuel passage 226b of fuel tube 222b communicates with a transverse secondary fuel channel 275b formed in outlet plate 212 for delivering modulating fuel to outlet port 212a by way of a central fuel feed channel 275. Thus, fuel feed channel 275 serves as junction for secondary fuel channels 275a and 275b, of valve units 220a and 220b, respectively.

Referring to FIG. 22, by way of example, the valve rotor 224a of valve unit 220a is depicted in an unlatched neutral position, which occurs when none of the four electromagnets 250a-250d are energized. This condition corresponds to a mean fuel flow condition, wherein the valve rotor 224a is disposed in a partially open position. In this position, the opposed fuel feed ports 242a, 242b of valve rotor 224a are partially aligned with the opposed fuel inlet ports 228a, 228b in valve shaft 222a so that modulating fuel flows into the annular fuel passage defined between the torsion spring 290a and the interior wall of the fuel passage 226a.

When valve rotor 224a is in the fully closed position shown in FIG. 23, it is rotated in a first or counter-clockwise direction from the neutral position shown in FIG. 22. Accordingly, the opposed fuel feed ports 242a, 242b of valve rotor 224a are moved completely out of alignment with the opposed fuel inlet ports 228a, 228b in valve shaft 222a. In this position, electromagnets 250b and 250c are energized so that valve rotor 224a is magnetically latched with respect to the diagonally opposed latching surfaces 258b and 258c of pole pieces 256b and 256c.

When valve rotor 224a is magnetically latched in this closed position of FIG. 23, torsion spring 290a is twisted in a counter-clockwise direction, thus storing mechanical energy in the form of torque. The stored mechanical energy in the torsion spring 290a is sufficient to accelerate or otherwise rapidly move the valve rotor 224a toward the open position shown in FIG. 25 when the valve rotor 224a is unlatched from latching surfaces 258b and 258c and electromagnets 250a and 250d are concomitantly energized. In this instance, the torque generated by the twisted torsion spring 290a is insufficient however, to overcome the magnetic latching force holding the valve rotor 224a in the closed position of FIG. 23.

When valve rotor 224a is in the fully open position shown in FIG. 24, it is rotated in a second or clockwise direction from the neutral position shown in FIG. 22. Accordingly, the opposed fuel feed ports 242a, 242b of valve rotor 224a are wholly aligned with the opposed fuel inlet ports 228a, 228b in valve shaft 222a. In this position, electromagnets 250a and 250d are energized so that valve rotor 224a is magnetically latched with respect to the diagonally opposed latching surfaces 258a and 258d of pole pieces 256a and 256d.

When valve rotor 224a is magnetically latched in this open position of FIG. 24, torsion spring 290a is twisted in a clockwise direction, thus storing mechanical energy in the form of torque. This stored mechanical energy in the torsion spring 290a is sufficient to rapidly move the valve rotor 224a toward the closed position shown in FIG. 23 when valve rotor 224a is unlatched from latching surfaces 258a and 258d and electromagnets 250b and 250c are concomitantly energized. In this instance, the torque generated by the twisted torsion spring 290a is insufficient however, to overcome the magnetic latching force holding the valve rotor 224a in the open position of FIG. 24.

Figure 25:
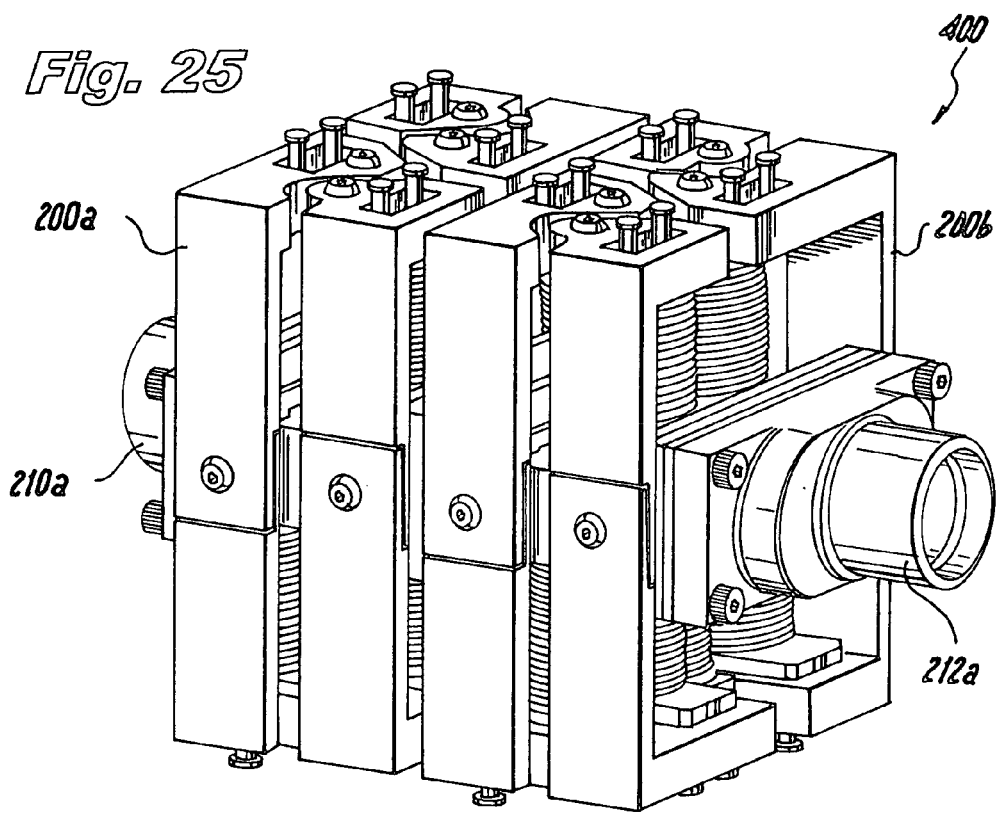
FIG. 25 is a perspective view of a four-valve assembly constructed with two serially connected two-valve assemblies of FIG. 15.
Figure 26:
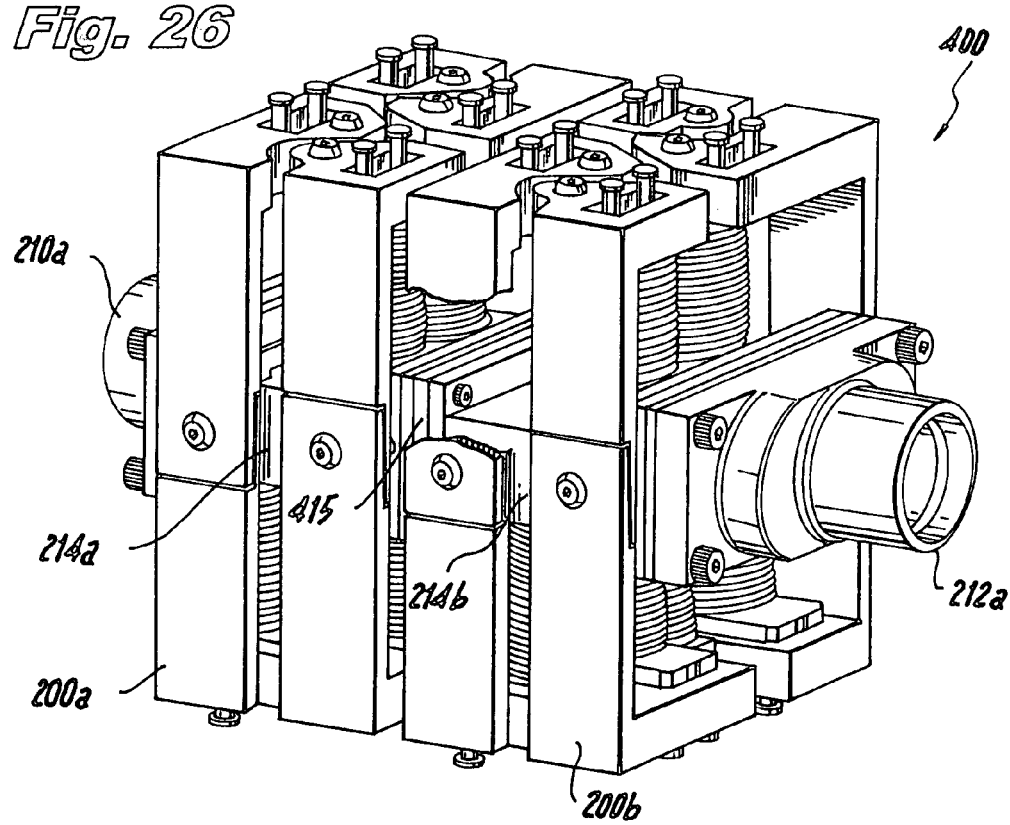
FIG. 26 is a perspective of the four-valve assembly shown in FIG. 25, with the sidewalls sectioned to illustrate the interior of the serially connected valve casings and the structure of the return straps that form part of the magnetic flux paths extending between diagonally opposed electromagnets.

Referring now to FIGS. 25 and 26, there is illustrated a four-bit latching oscillating valve assembly having torsion spring actuated valves, which is designated generally by reference numeral 400 and which is comprised of two cooperating two-bit valve assemblies 200a and 200b. In this arrangement, the inlet fitting 210 is operatively associated with the inlet side of valve assembly 200a, while the outlet fitting 212a is operatively associated with the outlet side of valve assembly 200b. An intermediate bridge plate 415 is disposed between the two valve assemblies to facilitate fluid communication therebetween, as to the primary fuel flow path and the modulated fuel flow paths. The bridge plate 415 is appropriately ported and channeled to communicate with the outlet side of valve assembly 200a and the inlet side of valve assembly 200b. Those skilled in the art will readily appreciate that any number of two-bit valve assemblies could be conjoined in the manner illustrated in FIGS. 25 and 26, so as to provide higher resolution and more control over fuel flow conditions.

Latching Oscillating Valve Assembly With Cantilever Spring Oscillation

Figure 27:
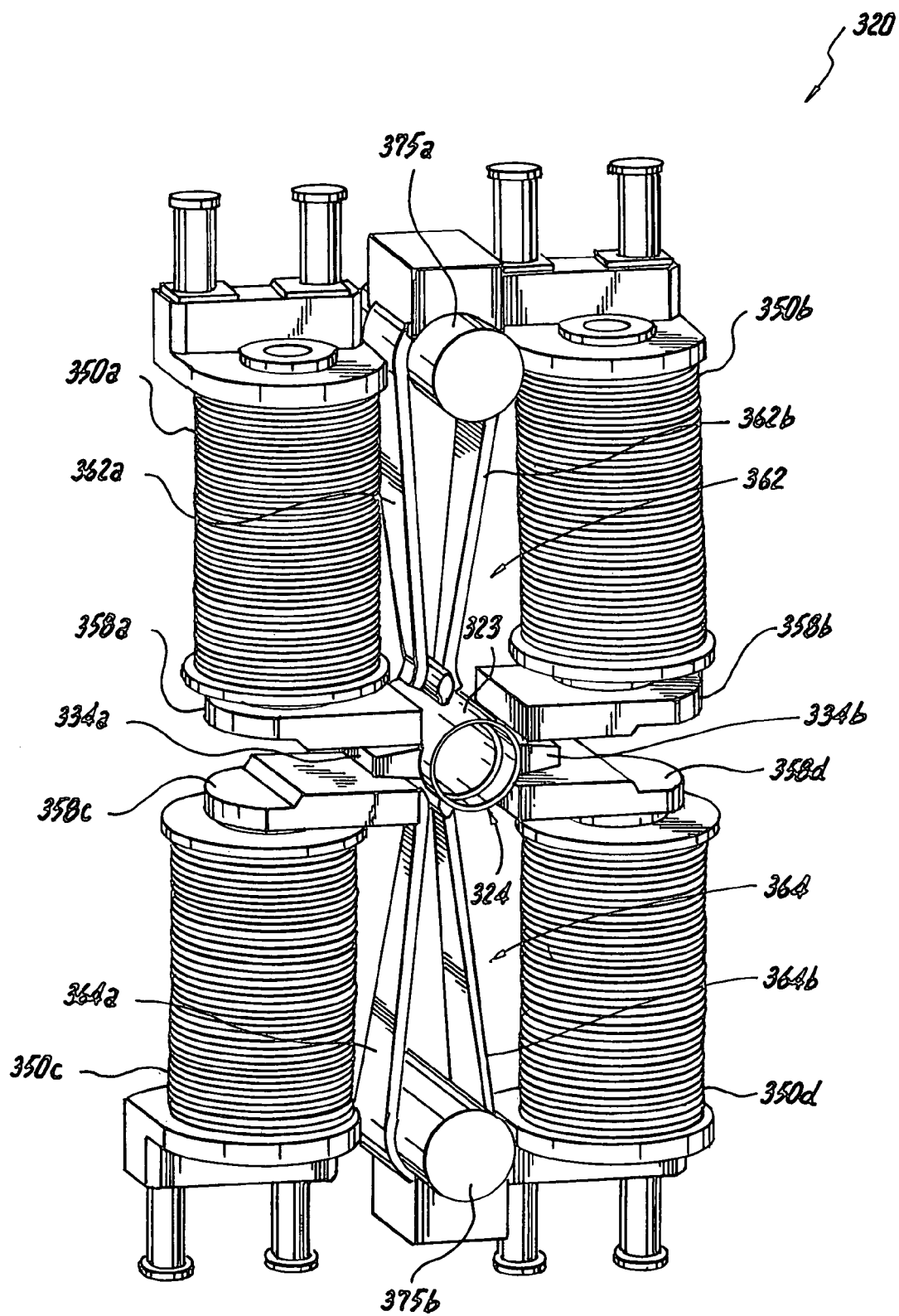
FIG. 27 is a perspective view of another type of valve rotor assembly constructed in accordance with a preferred embodiment of the subject invention, which includes opposed upper and lower cantilever springs for storing the mechanical energy needed to accelerate the valve rotor between open and closed magnetically latched positions.

Referring to FIG. 27, there is illustrated another latching oscillating valve unit for use in conjunction with the valve assemblies of the subject invention, which is designated generally by reference numeral 320. Valve unit 320 includes four electromagnets, including upper electromagnets 350a, 350b and lower electromagnets 350c, 350d. The upper electromagnets 350a, 350b are operatively connected to respective upper latching plates 358a, 358b, and the lower electromagnets 350c, 350d are operatively connected to respective lower latching plate 358c, 358d.

Figure 28:
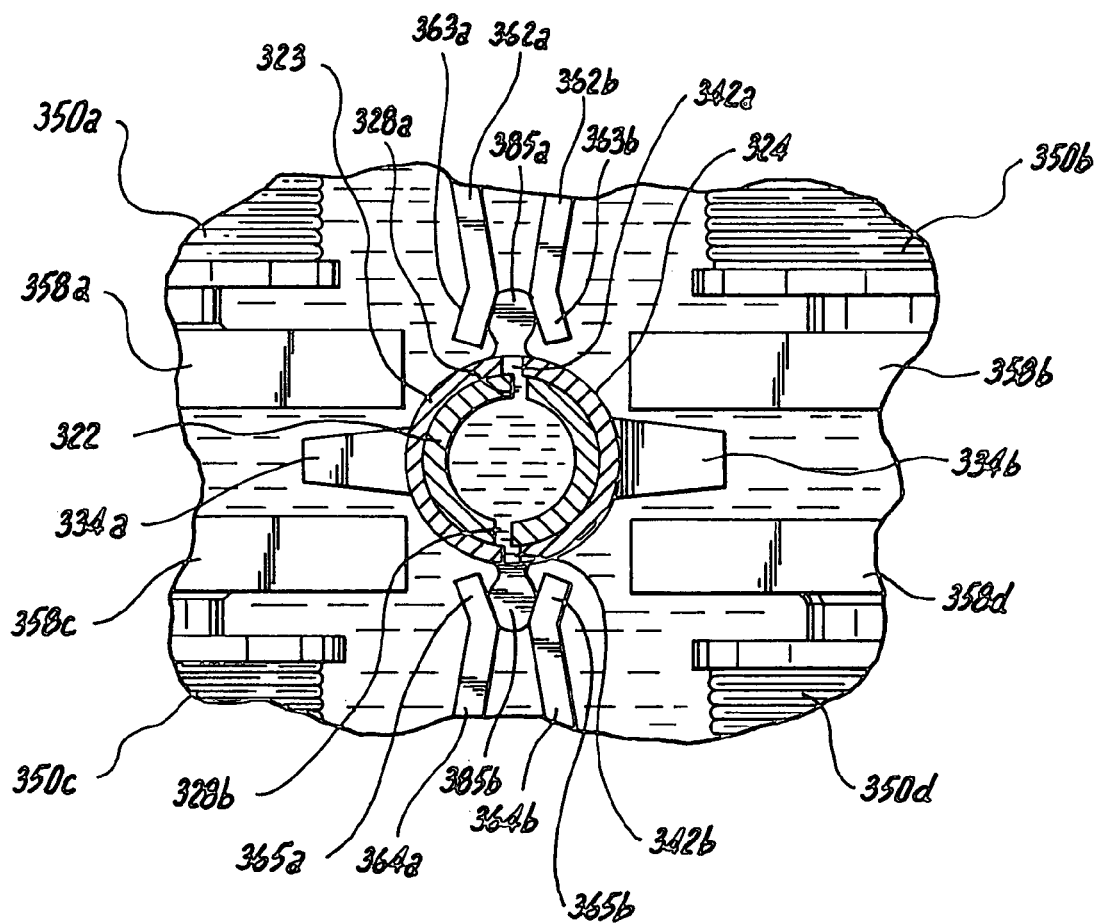
FIG. 28 is a cross-sectional view of the rotor assembly of FIG. 27, with the valve rotor in a neutral position, wherein the legs of the cantilever springs have a neutral bias.

Valve unit 320 includes a valve rotor 324 having a cylindrical body portion 323 that is dimensioned and configured to receive an elongated valve shaft 322 in rotationally supporting relationship (see e.g., FIG. 28). Laterally opposed wing portions 334a and 334b extend from body portion 323 to interact with the upper and lower latching surfaces 358a-358d associated with electromagnets 350a-350d. Valve unit 320 further includes opposed upper and lower cantilever springs 362 and 364 which store the mechanical energy to rapidly oscillate or otherwise accelerate the valve rotor 324 between open and closed magnetically latched positions to modulate fuel flow within the valve shaft 322 during operation.

With continuing reference to FIG. 27, the upper cantilever spring 362 has two inwardly biased legs 362a and 362b supported on an upper mounting rod 375a. The upper legs 362a and 362b include respective curved distal end portions 363a and 363b that interface with the involute surfaces of an upper engagement tooth 385a that extends upwardly from the central body portion 323 of valve rotor 324, as best seen in FIG. 28. Similarly, the lower cantilever spring 364 has two inwardly biased legs 364a and 364b that are supported on a lower mounting rod 375b. The lower legs 364a and 364b include respective curved distal end portions 365a and 365b that interface with the involute surfaces of a lower engagement tooth 385b that extends downwardly from the central body portion 323 of valve rotor 324, as best seen in FIG. 28.

The mechanical interaction between the opposed curved distal end portions (363a, 363b and 365a, 365b) of the spring legs (362a, 362b and 364a, 364b) of the upper and lower cantilever springs 362 and 364, and the involute surfaces of the upper and lower engagement teeth 385a and 385b, which is shown in FIG. 28, is similar to the interaction between two cooperating intermeshed spur gears. This serves to maximize rolling contact and minimize sliding friction between the spring legs and rotor engagement teeth.

In FIG. 28, valve rotor 324 is depicted in an unlatched neutral position, which occurs when none of the four electromagnets 350a-350d are de-energized. This position corresponds to a mean fuel flow condition, wherein the opposed fuel feed ports 342a, 342b of valve rotor 324 are partially aligned with the opposed fuel inlet ports 328a, 328b in valve shaft 322.

Figure 29:
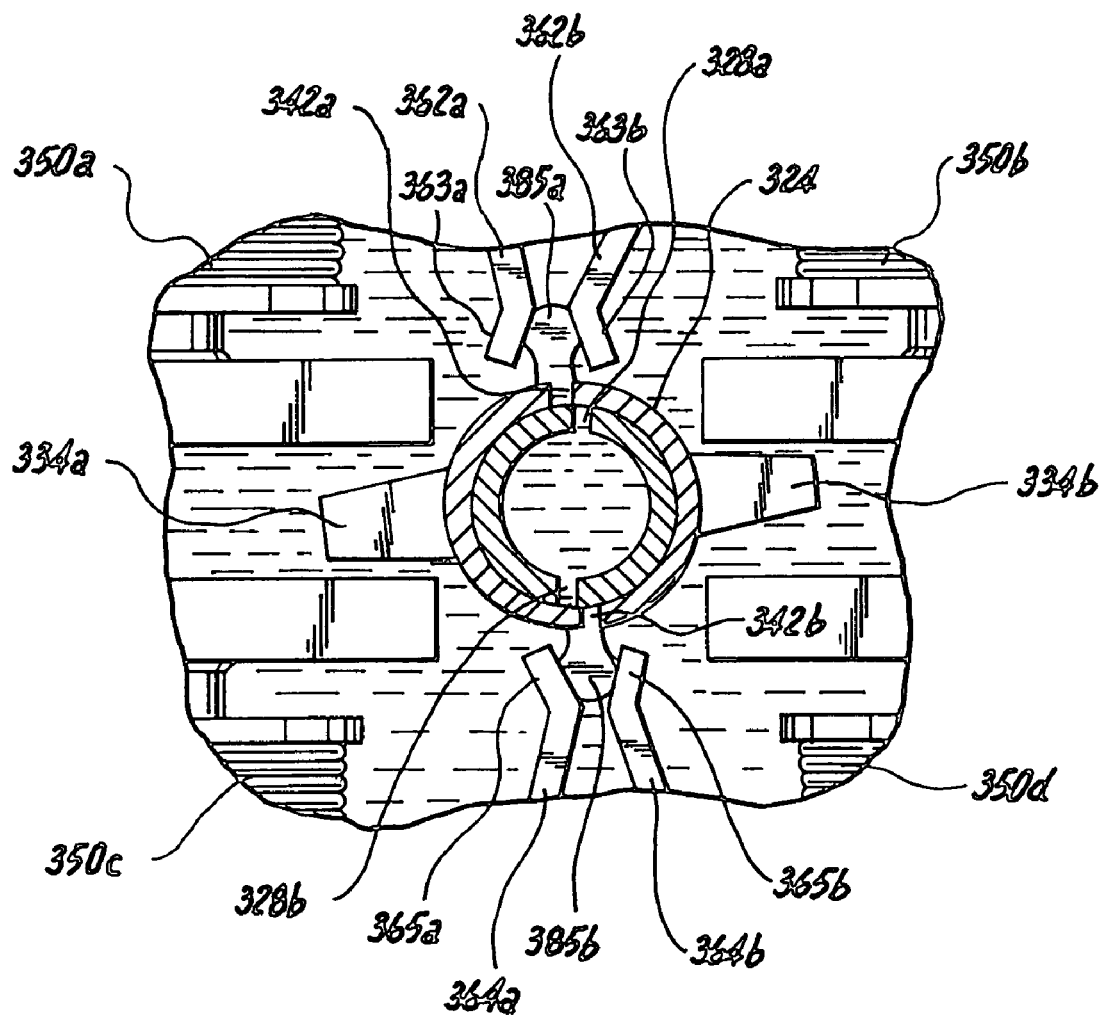
FIG. 29 is a cross-sectional view of the rotor assembly of FIG. 27, with the valve rotor magnetically latched in a fully closed position, when the legs of the opposed cantilever springs are biased toward the open position of FIG. 30.

Referring to FIG. 29, when valve rotor 324 is in a closed position, it is rotated in a first or counter-clockwise direction from the neutral position shown in FIG. 28. Accordingly, the opposed fuel feed ports 342a, 342b of valve rotor 324 are moved completely out of alignment with the opposed fuel inlet ports 328a, 328b in valve shaft 322. In this position, diagonally opposed electromagnets 350b and 350c are energized so that valve rotor 324 is magnetically latched with respect to the diagonally opposed latching plates 358b and 358c.

When valve rotor 324 is magnetically latched in the closed position of FIG. 29, spring leg 362a of the upper cantilever spring 362 and spring leg 364b of the lower cantilever spring 364 are deflected, thus storing mechanical energy. The stored mechanical energy in the two spring legs 362a, 364b is sufficient to move the valve rotor 324 toward the open position shown in FIG. 30, when the valve rotor 324 is unlatched and diagonally opposed electromagnets 350a and 350c are concomitantly energized. The force generated by the deflected spring legs 362a, 364b is insufficient however, to overcome the magnetic latching forces holding valve rotor 324 in the closed position of FIG. 30.

Figure 30:
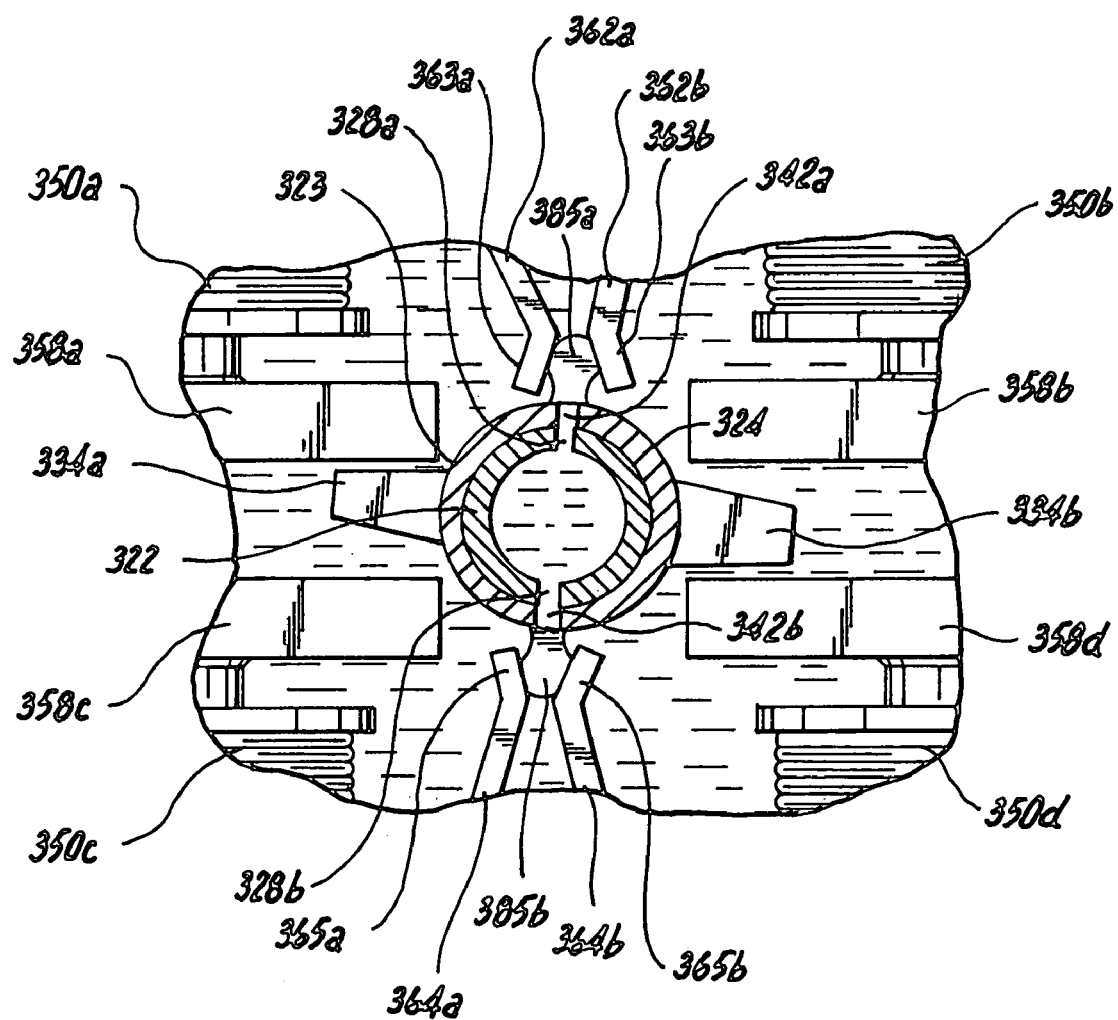
FIG. 30 is a cross-sectional view of the rotor assembly of FIG. 27, with the valve rotor magnetically latched in a fully open position, when the legs of the opposed cantilever springs are biased toward the closed position of FIG. 29.

Referring to FIG. 30, when valve rotor 324 is in an open position, it is rotated in a second or clockwise direction from the neutral position shown in FIG. 28. Accordingly, the opposed fuel feed ports 342a, 342b of valve rotor 324 are wholly aligned with the opposed fuel inlet ports 328a, 328b in valve shaft 322. In this position, diagonally opposed electromagnets 350a and 350d are energized so that valve rotor 324 is magnetically latched with respect to the diagonally opposed latching plates 358a and 358d.

When the valve rotor 324 is magnetically latched in the open position of FIG. 30, spring leg 362b of the upper cantilever spring 362 and spring leg 364a of the lower cantilever spring 364 are deflected, thus storing mechanical energy. The stored mechanical energy in the two deflected spring legs 362b, 364a is sufficient to move the valve rotor 324 toward the closed position shown in FIG. 29, when the valve rotor 324 is unlatched and diagonally opposed electromagnets 350b and 350d are concomitantly energized. The force generated by the deflected spring legs 362b, 364a is not sufficient however, to overcome the magnetic latching force holding valve rotor 324 in the open position of FIG. 30.

Although the subject invention, and each of the components thereof, has been described with respect to preferred embodiments, those skilled in the art will readily appreciate that changes and modifications may be made thereto without departing from the spirit and scope of the subject invention as defined by the appended claims. For example, in each of the disclosed embodiments of the subject invention, modulating fuel flows into a fuel passage formed within a valve shaft by way of one or more latching oscillating valve rotors. It is envisioned however, and well within the scope of the subject disclosure, that each of the disclosed embodiments of the invention could be configured so that modulating fuel flows from the fuel passage in the valve shaft into a fuel path that is exterior to the valve shaft, by way of one or more latching oscillating valve rotor. In such an instance, the primary fuel path would be defined by the passage in the valve shaft, while the modulating flow path would be defined outside the bore of the valve shaft. Other flow arrangements are also possible.

For example, it is also envisioned and well within the scope of the subject disclosure that the valve assembly of the subject invention could be configured to operate without any by-pass flow path through the valve housing, so that the modulated fuel flow delivered through the valve shaft would be the only output flow from the valve assembly. In such an instance, the average fuel flow rate for the valve assembly could correspond to the neutral potion of the valve rotors. It is further envisioned that when the valve assembly of the subject invention is configured in this manner, it could be used alone or in combination with another fuel flow path that delivers fuel to an injector at an unmodulated condition, so that the injector is fed by two separate fuel flows, arranged either in series or parallel.

What is claimed is:

1. A valve assembly for controlling the flow of fuel to a fuel nozzle, the valve assembly comprising:
   a) a valve housing having an inlet portion for receiving fuel from a fuel source and an outlet portion for delivering fuel to a fuel nozzle;
   b) an elongated fixed valve shaft disposed within the valve housing and having a longitudinal axis;
   c) at least one valve rotor rotatably mounted on the fixed valve shaft and which oscillates about the axis of the fixed valve shaft between first and second magnetically latched positions to modulate the flow of fuel delivered to the fuel nozzle; and
   d) electromagnetic means for alternately latching the at least one valve rotor in the first and second magnetically latched positions.

2. A valve assembly as recited in claim 1, wherein the at least one valve rotor is configured to modulate the flow of fuel delivered to the fuel nozzle within a predetermined modulation range.

3. A valve assembly as recited in claim 1, wherein fuel from a fuel source is admitted into the outlet portion of the valve housing by the at least one valve rotor when the at least one valve rotor is in the first magnetically latched position and when the at least one valve rotor is in the second magnetically latched position fuel from a fuel source is not admitted into the outlet portion of the valve housing by the at least one valve rotor.

4. A valve assembly as recited in claim 1, wherein the at least one valve rotor is formed from a ferritic magnetic flux permeable material and is mounted for oscillatory movement between the first and second magnetically latched positions.

5. A valve assembly as recited in claim 1, further comprising spring means for alternately moving the at least one valve rotor from one magnetically latched position to another magnetically latched position.

6. A valve assembly as recited in claim 1, wherein the at least one valve rotor and the fixed valve shaft have corresponding fuel ports arranged so that when the at least one valve rotor is in the first magnetically latched position the fuel ports of the at least one valve rotor communicate with the fuel ports of the valve shaft, and when the at least one valve rotor is in the second magnetically latched position the fuel ports of the at least one valve rotor do not communicate with the fuel ports of the valve shaft.

7. A valve assembly as recited in claim 6, wherein the fuel ports in the fixed valve shaft communicate with a fuel passage formed on the interior of the fixed valve shaft so that when the at least one valve rotor is in the first magnetically latched position fuel flows into the fuel passage and then to the outlet portion of the valve housing, and when the at least one valve rotor is in the second magnetically latched position fuel does not flow into the fuel passage.

8. A valve assembly as recited in claim 5, wherein the spring means includes a plurality of coiled springs operatively associated the at least one valve rotor.

9. A valve assembly as recited in claim 5, wherein the spring means includes a torsion spring operatively associated with the at least one valve rotor.

10. A valve assembly as recited in claim 5, wherein the spring means includes a cantilever spring operatively associated with the at least one valve rotor.

11. A valve assembly as recited in claim 1, wherein the electromagnetic means includes first and second magnetic flux paths.

12. A valve assembly as recited in claim 11, wherein the at least one valve rotor rotates in a first direction to the first magnetically latched position when the first magnetic flux path is energized and wherein the at least one valve rotor rotates in a second direction to the second magnetically latched position when the second magnetic flux path is energized.

13. A valve assembly as recited in claim 11, wherein the at least one valve rotor is adapted for movement into a neutral position between the first and second magnetically latched positions when the electromagnetic means are de-energized.

14. A valve assembly as recited in claim 1, wherein the at least one valve rotor has a generally cylindrical body portion configured for mounting on the fixed valve shaft, and a pair of diametrically opposed paddles extending radially outwardly from the generally cylindrical body portion to interact with the electromagnetic means.

15. A valve assembly as recited in claim 7, wherein means are provided in the fixed valve shaft, in communication with the fuel passage formed therein, to establish a fluidic bearing between an exterior surface of the fixed valve shaft and an interior surface of the at least one valve rotor.

16. A valve assembly as recited in claim 7, wherein a plurality of valve rotors are arranged within the valve housing, and each valve rotor is configured to produce a different fuel flow condition relative to the fixed valve shaft in dependence upon the configuration of the corresponding fuel ports associated therewith.

17. A valve assembly as recited in claim 16, wherein the plurality of valve rotors are mounted on a single fixed valve shaft in axial succession.

18. A valve assembly as recited in claim 16, wherein each of the plurality of valve rotors is mounted on a separate fixed valve shaft.

19. A valve assembly for modulating the flow of fuel to a fuel nozzle to actively control combustion in a gas turbine engine, the valve assembly comprising:
   a) a valve housing having an inlet portion for receiving fuel from a fuel source at an initial fuel flow rate, and an outlet portion for delivering fuel to a fuel nozzle at the initial fuel flow rate or at a modulated fuel flow rate depending upon a detected combustion condition;
   b) a primary fuel path defined within the valve housing and extending between the inlet portion and the outlet portion for conducting fuel through the valve housing;
   c) a valve shaft disposed within the valve housing and having a secondary fuel passage formed therein in fluid communication with the outlet portion of the valve housing;
   d) a valve rotor mounted for oscillatory movement on the valve shaft between a first magnetically latched position wherein fuel from the primary fuel path is admitted into the secondary fuel passage in the valve shaft for delivery to the outlet portion and a second magnetically latched position wherein fuel from the primary fuel path is prohibited from entering the secondary fuel passage in the valve shaft;
   e) electromagnetic means for alternately latching the valve rotor in the first and second magnetically latched positions to modulate the flow rate of the fuel delivered to a fuel nozzle in response to a detected combustion condition; and
   f) spring means for alternately moving the valve rotor from one magnetically latched position to another magnetically latched position.

20. A valve assembly as recited in claim 19, wherein the valve rotor and valve shaft have corresponding fuel ports arranged so that when the valve rotor is in the first magnetically latched position the fuel ports of the valve rotor communicate with the fuel ports of the valve shaft, and when the valve rotor is in the second magnetically latched position the fuel ports of the valve rotor do not communicate with the fuel ports of the valve shaft.

21. A valve assembly as recited in claim 20, wherein the fuel ports in the valve shaft communicate with the fuel passage formed in the valve shaft.

22. A valve assembly as recited in claim 19, wherein the spring means includes a plurality of coiled springs operatively associated the at least one valve rotor.

23. A valve assembly as recited in claim 19, wherein the spring means includes a torsion spring operatively associated with the at least one valve rotor.

24. A valve assembly as recited in claim 19, wherein the spring means includes a cantilever spring operatively associated with the at least one valve rotor.

25. A valve assembly as recited in claim 19, wherein the electromagnetic means includes first and second magnetic flux paths.

26. A valve assembly as recited in claim 25, wherein the valve rotor moves in a first direction to the first magnetically latched position when the first magnetic flux path is energized and wherein the valve rotor moves in a second direction to the second magnetically latched position when the second magnetic flux path is energized.

27. A valve assembly as recited in claim 19, wherein the valve rotor is adapted for movement into a neutral position when the electromagnetic means are de-energized so as to achieve a mean fuel flow condition between the primary fuel path and the fuel passage formed in the valve shaft.

28. A valve assembly as recited in claim 19, wherein the valve rotor has a generally cylindrical body portion configured for mounting on the valve shaft, and a pair of diametrically opposed paddles extending radially outwardly from the body portion to interact with the electromagnetic means.

29. A valve assembly as recited in claim 28, wherein the valve rotor is formed from a ferritic magnetic flux permeable material.

30. A valve assembly as recited in claim 28, wherein means are formed in the valve shaft, in communication with the fuel passage formed therein, to establish a fluidic bearing between the exterior surface of the valve shaft and an interior surface of the cylindrical body portion of the valve rotor supporting the oscillatory movement of the valve rotor.

31. A valve assembly as recited in claim 20, wherein a plurality of valve rotors are arranged within the valve housing, each on a respective valve shaft, and each valve rotor is adapted and configured to produce a unique fuel flow condition relative to the valve shaft associated therewith in dependence upon the configuration of the corresponding fuel ports associated therewith.

\* \* \* \* \*